US008235782B2

(12) United States Patent
Walker et al.

(10) Patent No.: US 8,235,782 B2
(45) Date of Patent: Aug. 7, 2012

(54) METHOD AND APPARATUS FOR TEAM PLAY OF SLOT MACHINES

(75) Inventors: Jay S. Walker, Ridgefield, CT (US); James A. Jorasch, Stamford, CT (US); Magdalena M. Fincham, Ridgefield, CT (US); Geoffrey M. Gelman, Stamford, CT (US); Stephen C. Tulley, Fairfield, CT (US); Daniel E. Tedesco, Huntington, CT (US); Robert C. Tedesco, Huntington, CT (US)

(73) Assignee: Zynga Inc., San Francisco, CA (US)

( * ) Notice: Subject to any disclaimer, the term of this patent is extended or adjusted under 35 U.S.C. 154(b) by 146 days.

(21) Appl. No.: 12/712,970

(22) Filed: Feb. 25, 2010

(65) Prior Publication Data

US 2010/0167802 A1 Jul. 1, 2010

Related U.S. Application Data

(63) Continuation of application No. 10/842,405, filed on May 10, 2004, now Pat. No. 7,695,358, which is a continuation-in-part of application No. 10/006,402, filed on Oct. 23, 2001, now Pat. No. 6,733,390, which is a continuation of application No. 09/108,827, filed on Jul. 1, 1998, now Pat. No. 6,312,332, which is a continuation-in-part of application No. 09/052,835, filed on Mar. 31, 1998, now Pat. No. 6,142,872.

(51) Int. Cl.
*A63F 13/00* (2006.01)

(52) U.S. Cl. ........................................... 463/13; 463/26

(58) Field of Classification Search ................ 463/9, 13, 463/16, 26, 40

See application file for complete search history.

(56) References Cited

U.S. PATENT DOCUMENTS 2,732,210 A 1/1956 Heide ............................ 463/60

(Continued)

FOREIGN PATENT DOCUMENTS

EP 843272 A1 5/1998

(Continued)

OTHER PUBLICATIONS

Website: "Action Gaming Inc / Video Poker Design / Architecture of Success / Matrix Poker", (http // www actiongaming com/ productdesigns/matrix_poker asp), download date: Jun. 3, 2004.

(Continued)

*Primary Examiner* — James S McClellan

(74) *Attorney, Agent, or Firm* — Martine Penilla Group, LLP

(57) ABSTRACT

A method of operating slot machines permits a machine to be identified as available for team play. Upon being identified for team play, the machine is grouped with other slot machines and subject to bonus conditions dependent on the team play. Bonus conditions typically including selected bonus outcomes and a bonus time period, during which bonus time period all outcomes of the grouped machines are monitored to determine the total bonus outcomes. If the total bonus outcomes of the team meet the bonus conditions within the bonus time period, then a bonus payout is awarded to all of the players. Players are thus encouraged to participate in a social, team environment with others of the team to win the group bonus. The invention is applicable to all slot machines, including video poker machines wherein the bonus outcomes include selected video poker hand ranks, and reeled slot machines wherein the bonus outcomes include selected reel outcomes.

8 Claims, 13 Drawing Sheets

U.S. PATENT DOCUMENTS

| | | | | |
|---|---|---|---|---|
| 4,621,814 | A | 11/1986 | Stepan et al. | 273/183 A |
| 4,636,951 | A | 1/1987 | Harlick | 364/412 |
| 4,669,731 | A | 6/1987 | Clarke | 273/143 R |
| 4,760,527 | A | 7/1988 | Sidley | |
| 4,773,647 | A | 9/1988 | Okada et al. | 273/143 R |
| 4,805,907 | A | 2/1989 | Hagiwara | |
| 4,837,422 | A | 6/1989 | Dethloff et al. | 235/380 |
| 4,837,728 | A | 6/1989 | Barrie et al. | 463/27 |
| 4,838,552 | A | 6/1989 | Hagiwara | 463/20 |
| 4,856,787 | A | 8/1989 | Itkis | 273/237 |
| 4,878,664 | A * | 11/1989 | Brookes | 473/23 |
| 4,926,327 | A | 5/1990 | Sidley | 364/412 |
| 5,042,818 | A | 8/1991 | Weingardt | 273/292 |
| 5,046,735 | A | 9/1991 | Hamano | |
| 5,083,271 | A | 1/1992 | Thacher et al. | 700/92 |
| 5,116,055 | A | 5/1992 | Tracy | 463/27 |
| 5,123,649 | A | 6/1992 | Tiberio | 273/143 R |
| 5,159,549 | A | 10/1992 | Hallman, Jr. et al. | 364/412 |
| 5,173,851 | A | 12/1992 | Off et al. | 364/401 |
| 5,178,390 | A | 1/1993 | Okada | 273/143 R |
| 5,179,517 | A | 1/1993 | Sarbin et al. | 463/25 |
| 5,242,163 | A | 9/1993 | Fulton | 273/85 CP |
| 5,275,400 | A | 1/1994 | Weingardt et al. | 273/269 |
| 5,280,909 | A | 1/1994 | Tracy | 273/138 A |
| 5,324,035 | A | 6/1994 | Morris et al. | 273/138 A |
| 5,342,047 | A | 8/1994 | Heidel et al. | 273/85 CP |
| 5,342,049 | A | 8/1994 | Wichinsky et al. | 273/119 R |
| 5,344,144 | A | 9/1994 | Canon | 273/138 |
| 5,356,140 | A | 10/1994 | Dabrowski et al. | 273/85 CP |
| 5,377,973 | A | 1/1995 | Jones et al. | 273/85 CP |
| 5,393,057 | A | 2/1995 | Marnell, II | 273/85 CP |
| 5,393,061 | A | 2/1995 | Manship et al. | 273/143 R |
| 5,401,023 | A | 3/1995 | Wood | |
| 5,409,225 | A | 4/1995 | Kelly et al. | 273/118 A |
| 5,429,361 | A | 7/1995 | Raven | |
| 5,472,194 | A | 12/1995 | Breeding et al. | 463/27 |
| 5,482,289 | A | 1/1996 | Weingardt | 273/269 |
| 5,494,287 | A | 2/1996 | Manz | 273/143 R |
| 5,511,781 | A | 4/1996 | Wood et al. | 273/85 CP |
| 5,531,440 | A | 7/1996 | Dabrowski et al. | 463/12 |
| 5,544,892 | A | 8/1996 | Breeding | 273/292 |
| 5,559,312 | A | 9/1996 | Lucero | 463/25 |
| 5,560,603 | A | 10/1996 | Seelig et al. | 273/143 |
| 5,564,700 | A | 10/1996 | Celona | 463/27 |
| 5,580,309 | A | 12/1996 | Piechowiak et al. | 463/16 |
| 5,593,349 | A | 1/1997 | Miguel et al. | 463/30 |
| 5,597,163 | A | 1/1997 | Takemoto et al. | 273/309 |
| 5,601,488 | A | 2/1997 | Kadlic | |
| 5,603,502 | A | 2/1997 | Nakagawa | 273/292 |
| 5,611,535 | A | 3/1997 | Tiberio | 273/143 R |
| 5,611,730 | A | 3/1997 | Weiss | 463/20 |
| 5,621,201 | A | 4/1997 | Langhans et al. | 235/380 |
| 5,639,088 | A | 6/1997 | Schneider et al. | 273/138.2 |
| 5,655,961 | A | 8/1997 | Acres et al. | 463/27 |
| 5,674,128 | A | 10/1997 | Holch et al. | 463/42 |
| 5,695,400 | A | 12/1997 | Fennell, Jr. et al. | 463/42 |
| 5,702,304 | A | 12/1997 | Acres et al. | 463/29 |
| 5,711,715 | A | 1/1998 | Ringo et al. | 473/9 |
| 5,741,183 | A | 4/1998 | Acres et al. | 463/42 |
| 5,752,882 | A | 5/1998 | Acres et al. | 463/42 |
| 5,755,621 | A | 5/1998 | Marks et al. | 463/42 |
| 5,761,647 | A | 6/1998 | Boushy | 705/10 |
| 5,766,076 | A | 6/1998 | Pease et al. | 463/27 |
| 5,768,382 | A | 6/1998 | Schneier et al. | 380/251 |
| 5,770,533 | A | 6/1998 | Franchi | 763/42 |
| 5,772,506 | A | 6/1998 | Marks et al. | 463/13 |
| 5,772,509 | A | 6/1998 | Weiss | 463/16 |
| 5,810,361 | A * | 9/1998 | Kadlic | 273/292 |
| 5,811,772 | A | 9/1998 | Lucero | 235/380 |
| 5,816,915 | A * | 10/1998 | Kadlic | 463/13 |
| 5,823,879 | A | 10/1998 | Goldberg et al. | 463/42 |
| 5,836,586 | A | 11/1998 | Marks et al. | 273/292 |
| 5,848,932 | A | 12/1998 | Adams | 463/20 |
| 5,851,147 | A | 12/1998 | Stupak et al. | 463/13 |
| 5,855,008 | A | 12/1998 | Goldhaber et al. | 705/14 |
| 5,882,260 | A | 3/1999 | Marks et al. | 463/13 |
| 5,882,262 | A | 3/1999 | Ballhorn | 463/43 |
| 5,910,048 | A | 6/1999 | Feinberg | 463/25 |
| 5,964,660 | A | 10/1999 | James et al. | 463/1 |
| 5,967,896 | A | 10/1999 | Jorasch et al. | 463/25 |
| 5,979,702 | A | 11/1999 | Hennessey et al. | 221/206 |
| 5,980,384 | A | 11/1999 | Barrie | 463/16 |
| 6,010,404 | A | 1/2000 | Walker et al. | 463/21 |
| 6,012,982 | A | 1/2000 | Piechowiak et al. | 463/16 |
| 6,019,374 | A | 2/2000 | Breeding | 273/292 |
| 6,024,642 | A | 2/2000 | Stupak | 463/20 |
| 6,033,307 | A | 3/2000 | Vancura | 463/20 |
| 6,039,648 | A | 3/2000 | Guinn et al. | 463/16 |
| 6,077,162 | A | 6/2000 | Weiss | 463/26 |
| 6,077,163 | A | 6/2000 | Walker et al. | 463/26 |
| 6,089,975 | A | 7/2000 | Dunn | 463/16 |
| 6,089,980 | A | 7/2000 | Gauselmann | 463/27 |
| 6,093,100 | A | 7/2000 | Singer et al. | 463/13 |
| 6,113,102 | A | 9/2000 | Marks et al. | 273/292 |
| 6,117,011 | A | 9/2000 | Lvov | 463/25 |
| 6,135,882 | A | 10/2000 | Kadlic | 463/13 |
| 6,142,872 | A | 11/2000 | Walker et al. | 463/16 |
| 6,206,782 | B1 | 3/2001 | Walker et al. | 463/25 |
| 6,220,959 | B1 | 4/2001 | Holmes, Jr. et al. | 463/13 |
| 6,234,897 | B1 | 5/2001 | Frohm et al. | 463/20 |
| 6,247,643 | B1 | 6/2001 | Lucero | 235/380 |
| 6,270,412 | B1 | 8/2001 | Crawford et al. | 463/20 |
| 6,287,202 | B1 | 9/2001 | Pascal et al. | 463/42 |
| 6,312,332 | B1 | 11/2001 | Walker et al. | 463/23 |
| 6,334,814 | B1 | 1/2002 | Adams | 463/20 |
| 6,361,441 | B1 | 3/2002 | Walker et al. | 463/42 |
| 6,364,765 | B1 | 4/2002 | Walker et al. | 463/16 |
| 6,375,568 | B1 | 4/2002 | Roffman et al. | 463/23 |
| 6,394,456 | B1 | 5/2002 | Long | 273/292 |
| 6,416,408 | B2 | 7/2002 | Tracy et al. | 463/16 |
| 6,439,993 | B1 | 8/2002 | O'Halloran | 463/16 |
| 6,461,241 | B1 | 10/2002 | Webb et al. | 463/20 |
| 6,471,208 | B2 | 10/2002 | Yoseloff et al. | 273/143 R |
| 6,482,089 | B2 | 11/2002 | DeMar et al. | 463/20 |
| 6,503,146 | B2 | 1/2003 | Walker et al. | 463/25 |
| 6,514,144 | B2 | 2/2003 | Riendeau et al. | 463/42 |
| 6,645,074 | B2 | 11/2003 | Thomas et al. | 463/20 |
| 6,652,378 | B2 | 11/2003 | Cannon et al. | 463/20 |
| 6,656,048 | B2 | 12/2003 | Olsen | 463/25 |
| 6,663,487 | B1 | 12/2003 | Ladner | 463/13 |
| 6,692,353 | B2 | 2/2004 | Walker et al. | 463/16 |
| 6,712,699 | B2 | 3/2004 | Walker et al. | 463/30 |
| 6,733,390 | B2 | 5/2004 | Walker et al. | 463/23 |
| 6,837,793 | B2 | 1/2005 | McClintic | 463/42 |
| 6,902,478 | B2 | 6/2005 | McClintic | 463/16 |
| 6,923,719 | B2 | 8/2005 | Wolf | 463/16 |
| 2002/0055381 | A1 | 5/2002 | Tarantino | 463/20 |
| 2003/0027628 | A1 | 2/2003 | Luciano | 463/20 |
| 2003/0064807 | A1 | 4/2003 | Walker et al. | 463/42 |
| 2003/0078101 | A1 | 4/2003 | Schneider et al. | 463/42 |
| 2003/0224852 | A1 | 12/2003 | Walker et al. | 463/20 |

FOREIGN PATENT DOCUMENTS

| | | |
|---|---|---|
| GB | 2 161 008 A | 1/1986 |
| WO | WO 96/08295 | 1/1986 |
| WO | WO 03/018150 A1 | 3/2003 |

OTHER PUBLICATIONS

Notice of Allowability for U.S. Appl. No. 09/052,835 dated Mar. 22, 2000, 2pp.

Notice of Allowability for U.S. Appl. No. 09/052,835 dated Mar. 13, 2000, 9pp.

Office Action for U.S. Appl. No. 09/108,827 dated Oct. 26, 2000, 8pp.

Office Action for U.S. Appl. No. 09/108,827 dated Mar. 23, 2000, 12pp.

Notice of Allowability for U.S. Appl. No. 09/108,827 dated Jun. 15, 2001, 3pp.

Office Action for U.S. Appl. No. 10/006,402 dated Mar. 12, 2003, 14pp.

Office Action for U.S. Appl. No. 10/006,402 dated Sep. 8, 2003, 7pp.

Notice of Allowability for U.S. Appl. No. 10/006,402 dated Jan. 28, 2004.

Author Unknown, "Hot Slots & Reel Deals", Atlantic City Insider, Oct. 1996, vol. I, No. 2., 5pp.

"Mega Vigil", Las Vegas Adviser, Jul. 1998 at p. 12.
Office Action for U.S. Appl. No. 09/152,402, dated Mar. 7, 2000, 14pp.
Notice of Allowability for U.S. Appl. No. 09/152,402, dated Oct. 3, 2000, 5pp.
Office Action for U.S. Appl. No. 09/793,020, dated Sep. 28, 2001, 10pp.
Office Action for U.S. Appl. No. 10/190,722, dated Dec. 17, 2003, 10pp.
Notice of Allowability for U.S. Appl. No. 10/190,722, dated Jun. 18, 2004, 8pp.
Office Action for U.S. Appl. No. 10/190,722, dated Sep. 10, 2003 3pp.
Office Action for U.S. Appl. No. 10/869,975, dated May 15, 2007, 11pp.
Office Action for U.S. Appl. No. 10/869,975, dated Sep. 22, 2006, 16pp.
Grochowski, John, "Players Look for Edge With Casino Gimmicks", Chicago Sun-Times, Aug. 25, 1995, Section: Weekend Plus, Gaming, p. 15, NC., 2pp.
Rose, Bob, "New Ways for the House to Win", St. Louis Post-Dispatch, Oct. 3, 1996, Section: Get Out, p. 50, 2pp.
"Triple Play Poker Takes Casino Industry by Storm", IGT Press Releases, Feb. 18, 1998 (http://www.igtgame.com/press/02/18/98.html), 2pp.
Website: Brokopp, John G., "One Way to Manipulate Players' Clubs", Casino City Times, Feb. 6, 2001, (http://brokopp.casinocitytimes.com/articles/534.html), 3pp.
Dancer, Bob and Compton, Jeffrey, "Player's Edge: Cannery's machines tighter than most locals' casinos", Las Vegas Review-Journal (Nevada), Jan. 10, 2003, 2pp.
Website: Brokopp, John G., "Player's Club Strategy for Couples", Casino City Times, Dec. 3, 2003, (http://brokopp.casinocitytimes.com/articles/8065.html)., 3pp.
Website: "Tunica Casino Slot and Table Play Club", (http://www.tunica-ms.com/casino_slot_clubs.htm), download date: Mar. 26, 2004, 3pp.
Office Action for U.S. Appl. No. 10/811,583, dated Jun. 27, 2006, 12pp.
Office Action for U.S. Appl. No. 10/811,583, dated Jan. 31, 2007, 17pp.
Office Action for U.S. Appl. No. 10/811,583, dated Jul. 10, 2007, 17pp.
Office Action for U.S. Appl. No. 10/794,338, dated Feb. 27, 2007, 12pp.
Office Action for U.S. Appl. No. 10/794,338, dated Jan. 30, 2007, 12pp.
Office Action for U.S. Appl. No. 10/794,338, dated Aug. 11, 2006, 12pp.
Office Action for U.S. Appl. No. 10/794,338, dated Dec. 20, 2005, 8pp.
Office Action for U.S. Appl. No. 10/254,831, dated Sep. 22, 2006, 23pp.
Office Action for U.S. Appl. No. 10/254,831, dated Mar. 8, 2007, 22pp.
Office Action for U.S. Appl. No. 11/422,778, dated Mar. 20, 2007, 15pp.
Website: "Money Time at Casino Windsor", (http://www.casinowindsor.com/casino/slots/moneytime.htm), download date: Jul. 25, 2001, 1 pg.
Fine, Adam, "Player's Network Gaming Guide Article—Big River", The Casino Player, (http://www.players network.com/travel/articles/big-river001,005.html), download date: Jul. 25, 2001, 2pp.
Website: "CASINO CIRCLE! Presnets $$$ Free $$$ Online Slot Tournaments and other Choice Online Casino Games of Chance, Luck and Skill that PAY-OFF!", (http://www.sidewalkshoppes.com/slots_free_tournaments.html), download date: Jul. 26, 2001, 8pp.
Website: "Casinos featuring Slot Tournaments in Las Vegas—Slot tournaments and how they work", (http://interexna.com/tournaments.html), download date: Jul. 26, 2001, 2pp.
Website: "gameland.com", (http://gameland.com/home/), download date: Sep. 5, 2001, 2pp.
Office Action for U.S. Appl. No. 10/067,576, dated Feb. 28, 2003, 13pp.
Office Action for U.S. Appl. No. 11/427,131, dated Apr. 3, 2007, 13pp.
Office Action for U.S. Appl. No. 11/427,131, dated Aug. 22, 2007, 9pp.
Office Action for U.S. Appl. No. 11/427,131, dated Sep. 12, 2006, 10 pp.
Notice of Allowability for U.S. Appl. No. 09/793,020, dated Sep. 9, 2002, 4pp.
Notice of Allowability for U.S. Appl. No. 09/793,020, dated Apr. 12, 2002, 7pp.
Office Action for U.S. Appl. No. 10/414,934, dated Nov. 16, 2006, 23pp.
Office Action for U.S. Appl. No. 10/794,338, dated Aug. 1, 2007, 13pp.
Advisory Action for U.S. Appl. No. 10/794,338, dated Oct. 1, 2007, 3pp.

* cited by examiner

MACHINE STATUS DATABASE 80

| | MACHINE IDENTIFIER 84 | STATUS 86 | TEAM 88 |
|---|---|---|---|
| 82A | 12345 | ACTIVE | A |
| 82B | 45678 | ACTIVE | B |
| 82C | 76543 | AVAILABLE | N/A |
| 82D | 87654 | UNAVAILABLE | N/A |

FIG. 6

BONUS PAYOUT DATABASE 90

| | NUMBER OF PLAYERS 94 | BONUS HAND 96 | REQUIRED QUANTITY 97 | TIME LIMIT 98 | PAYOUT 100 |
|---|---|---|---|---|---|
| 92A | 5 | ROYAL FLUSH | 2 | 120 SEC. | 500 |
| 92B | 4 | "FOUR OF A KIND" | 3 | 30 SEC. | 25 |
| 92C | 5 | FLUSH | 5 | 60 SEC. | 10 |

FIG. 7

TRANSACTION DATABASE 110

| | TEAM IDENTIFIER 114 | MACHINE 1 116 | MACHINE 2 118 | MACHINE 3 120 | MACHINE 4 122 | MACHINE 5 124 |
|---|---|---|---|---|---|---|
| 112A | A | 12345 | 23456 | 34567 | OPEN | OPEN |
| 112B | B | 45678 | 56789 | 67890 | 78901 | 89012 |
| 112C | C | 90123 | 01234 | OPEN | OPEN | OPEN |

FIG. 8

METHOD AND APPARATUS FOR TEAM PLAY OF SLOT MACHINES

The present application is a continuation of U.S. patent application Ser. No. 10/842,405, filed May 10, 2004, now U.S. Pat. No. 7,695,358 titled: METHOD AND APPARATUS FOR TEAM PLAY OF SLOT MACHINES, which has been allowed on Nov. 16, 2009;

which application is a continuation-in-part of U.S. patent application Ser. No. 10/006,402 filed 23 Oct. 2001, now U.S. Pat. No. 6,733,390 titled: METHOD AND APPARATUS FOR TEAM PLAY OF SLOT MACHINES;

which is a continuation of patent application Ser. No. 09/108,827 filed 1 Jul. 1998,titled: METHOD AND APPARATUS FOR TEAM PLAY OF SLOT MACHINES which issued as U.S. Pat. No. 6,312,332 on 6 Nov. 2001;

which is a continuation-in-part of U.S. patent application Ser. No. 09/052,835 filed 31 Mar. 1998,in the name of Walker, et al., titled: METHOD AND APPARATUS FOR TEAM PLAY OF SLOT MACHINES which issued as U.S. Pat. No. 6,142,872 on 7 Nov. 2000.

Each of the above applications is incorporated by reference in its entirety.

FIELD OF THE INVENTION

The present invention relates generally to slot machines and more particularly to methods and apparatus for enabling team play of slot machines.

BRIEF DESCRIPTION OF THE DRAWINGS

These and other objects, features and advantages of the invention will become apparent through a consideration of the detailed description of the invention, in which:

FIG. 6 is a table showing exemplary contents of the machine status database of FIG. 3;

FIG. 7 is a table showing exemplary contents of the bonus payout database of FIG. 4;

FIG. 8 is a table showing exemplary contents of the transaction database of FIG. 3;

DETAILED DESCRIPTION OF THE INVENTION

Figure 1:
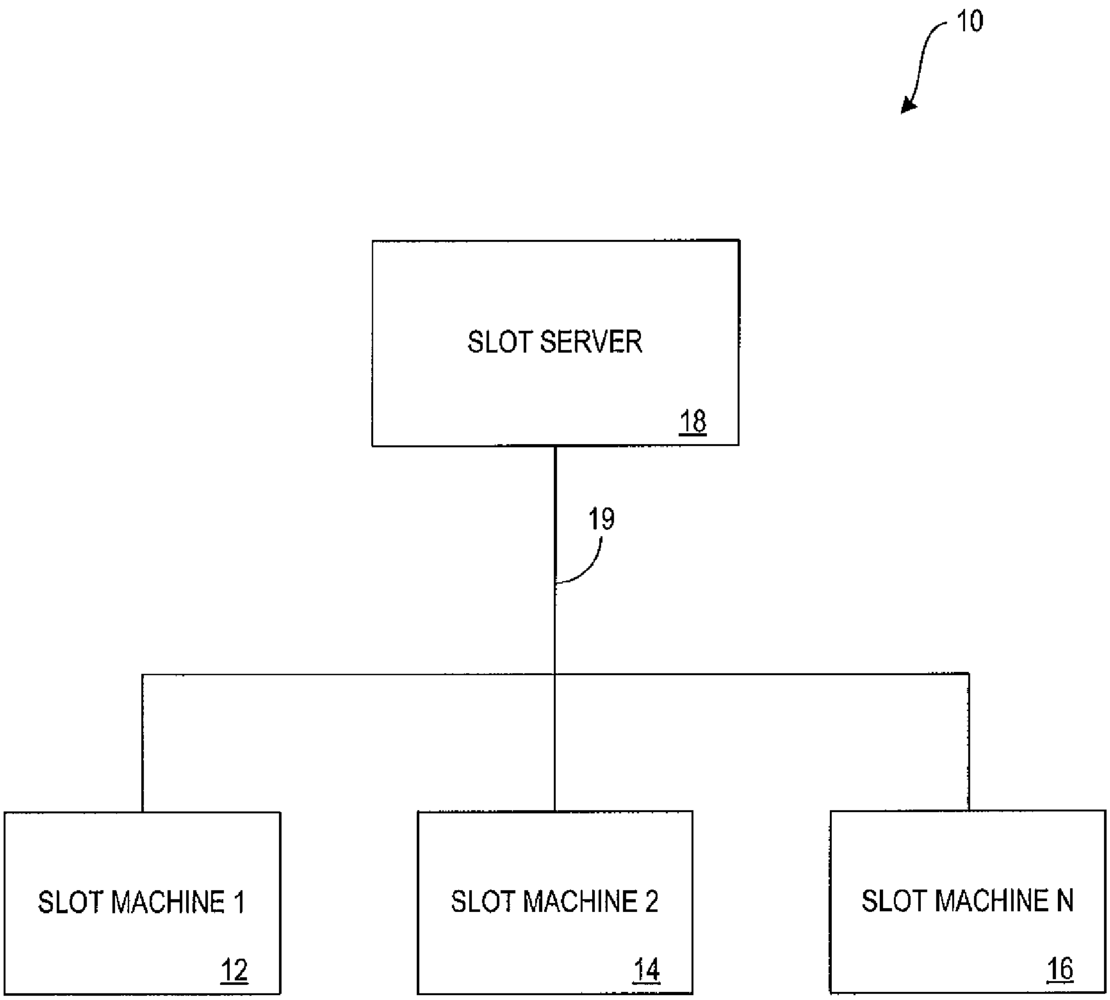
FIG. 1 is a diagrammatic view showing one embodiment of linked slot machines in accordance with the invention.

Various embodiments provide a method by which individual members of a team may discard cards from their respective hands of video poker into a common pool of discards. New hands of video poker may be formed from the pool of discards. Such new hands may result in a benefit being provided to the team.

Various embodiments provide a method by which individual team members may contribute cards from their respective hands in order to populate a common five-by-five grid of cards. New hands of video poker may be formed using the rows, columns, and/or diagonals of the grid. Such new hands may result in a benefit being provided to the team.

Various embodiments provide a method by which players may compete against one another in a video poker tournament, in which players receives the same starting hands. In this way, the playing field is made more level.

Various embodiments provide a method by which multiple players may form hands of video poker using a common group of "community cards". In this way, players may enjoy camaraderie with fellow players using the same community cards.

Various embodiments of the present invention provide a slot machine conducive to team play and player interaction, which may increase the attractiveness of the machine to players.

Various embodiments of the invention provide video poker machines playable in a cooperative, group manner, which may encourage team play and some level of interaction amongst the players.

In accordance with various embodiments of the invention, there is provided a method and system for operating slot machines, the method comprising the steps of: identifying at least two slot machines for team play, determining a set of bonus conditions for the team play including a bonus payout if the bonus conditions are satisfied by the team play, initiating a bonus time period during which the bonus conditions are active, and analyzing outcomes from the first and second slot machines to determine if the bonus conditions are met during the bonus time period.

In various embodiments of the invention, the bonus conditions further include a requisite number of a specified bonus outcome, the bonus outcomes being totaled between the two machines to determine if the requisite number is met. The bonus time period is initiated upon the occurrence of the first bonus outcome at any of the grouped machines.

When implemented with video poker machines, the bonus conditions include a specified rank of video poker hands. The number and rank of the hands, and the length of the bonus time period, can be selected to provide a desired house advantage. Data describing the progress of the team play can be transmitted for display to each of the team players, thereby encouraging interaction amongst the players and the development of a team spirit.

In accordance with various embodiments of the invention, there is provided a method and system for identifying slot machines for team play, the method comprising the steps of: receiving from a first slot machine a signal requesting group play, determining one or more additional slot machines available for group play, and identifying the first slot machine as part of a group including the one or more additional slot machines.

In various embodiments, the signal to request group play is initiated by a player who desires to engage in group play. Various embodiments are further provided wherein a player may request the termination of group play.

The present invention provides a method and system for introducing the concepts of team play and social interaction into slot machines through the incorporation of bonus payouts available to a group or team of players if specified bonus conditions are met. In one embodiment, the specified bonus conditions require the team to obtain a requisite number of bonus outcomes within a predefined time period. Bonus outcomes may include, for example ranked hands in video poker (such as a four-of-a-kind or a straight), or reel outcomes in slot machines (such as “cherry-cherry-cherry” or “lemon-lemon-lemon”). The invention thus encourages concerted action by all of the linked players to achieve the bonus outcome.

With reference now to FIG. 1, a system 10 of slot machines 12, 14, 16 is shown, the slot machines connected to a slot server 18 via a communications channel 19.

As used herein, the term “slot machine” is defined to include all electronic gaming devices of the type wherein a paid play results in an outcome used to determine a payout. Such slot machines include, but are not limited to: video poker machines, reel symbol slot machines (mechanical and electrical), video blackjack machines, lottery machines, bingo machines, and keno machines. The invention has particular application to video poker machines, an exemplary one of which is described with respect to FIG. 4 below.

The terms “group” and “team” are used interchangeably herein to identify a plurality of slot machines linked for cooperative play in the manner described below.

Slot server 18 comprises a commercially available computer server, exemplary types of which are described below with respect to FIG. 3.

Communications channel 19 comprises an appropriate data communications system, for example a local or wide area network (LAN and WAN, respectively). According to well known embodiments, communications channel 19 may be wired or wireless in nature. Exemplary wireless systems include cellular radio frequency (RF), and infra-red (IR) systems. In a preferred embodiment, communications channel 19 comprises a wired, local area network.

Figure 2:
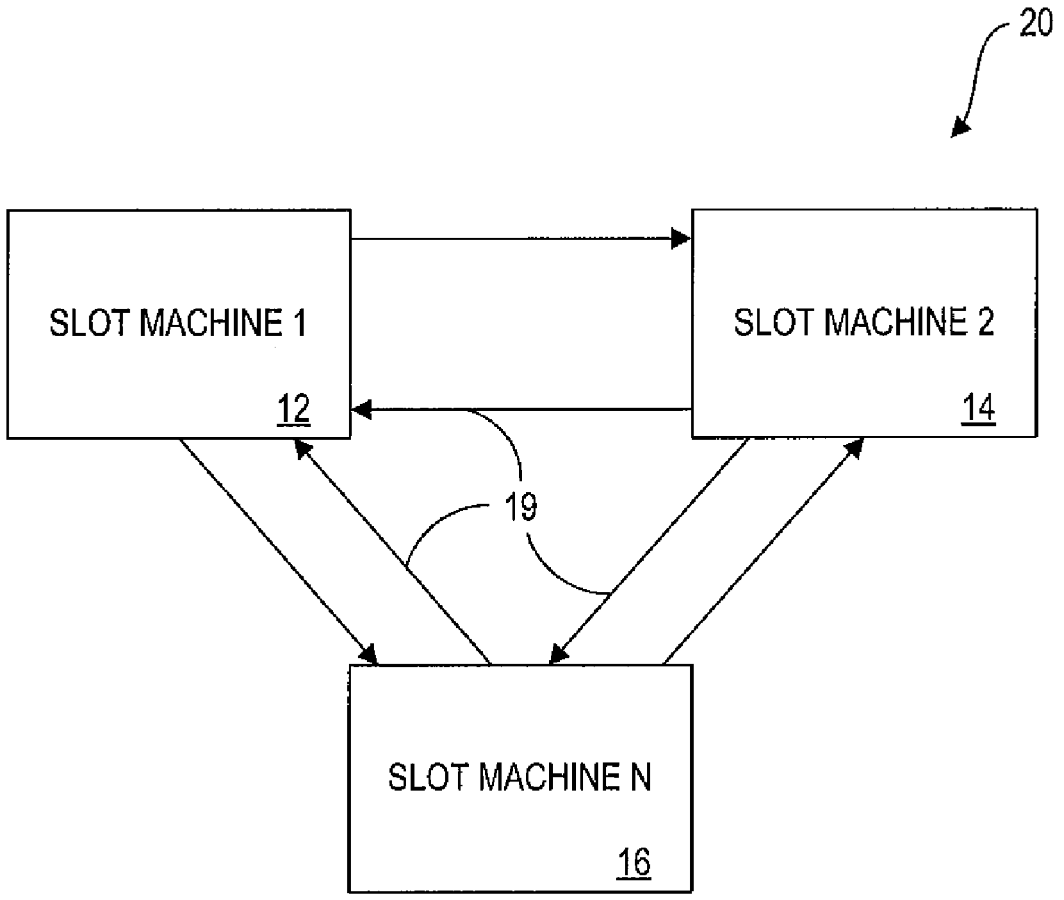
FIG. 2 is a diagrammatic view showing another embodiment of linked slot machines in accordance with the invention.

With reference to FIG. 2, an alternate system 20 of slot machines 12, 14, 16 are shown wherein the slot machines are directly interconnected through communications channel 19 without the use of a slot server. The function of the server (server 18 of FIG. 1) is incorporated into one or more of the slot machines 12, 14, 16. Slot machines 12, 14, and 16 and communications channel 19 are otherwise identical in structure to the like-numbered elements of FIG. 1.

Figure 3:
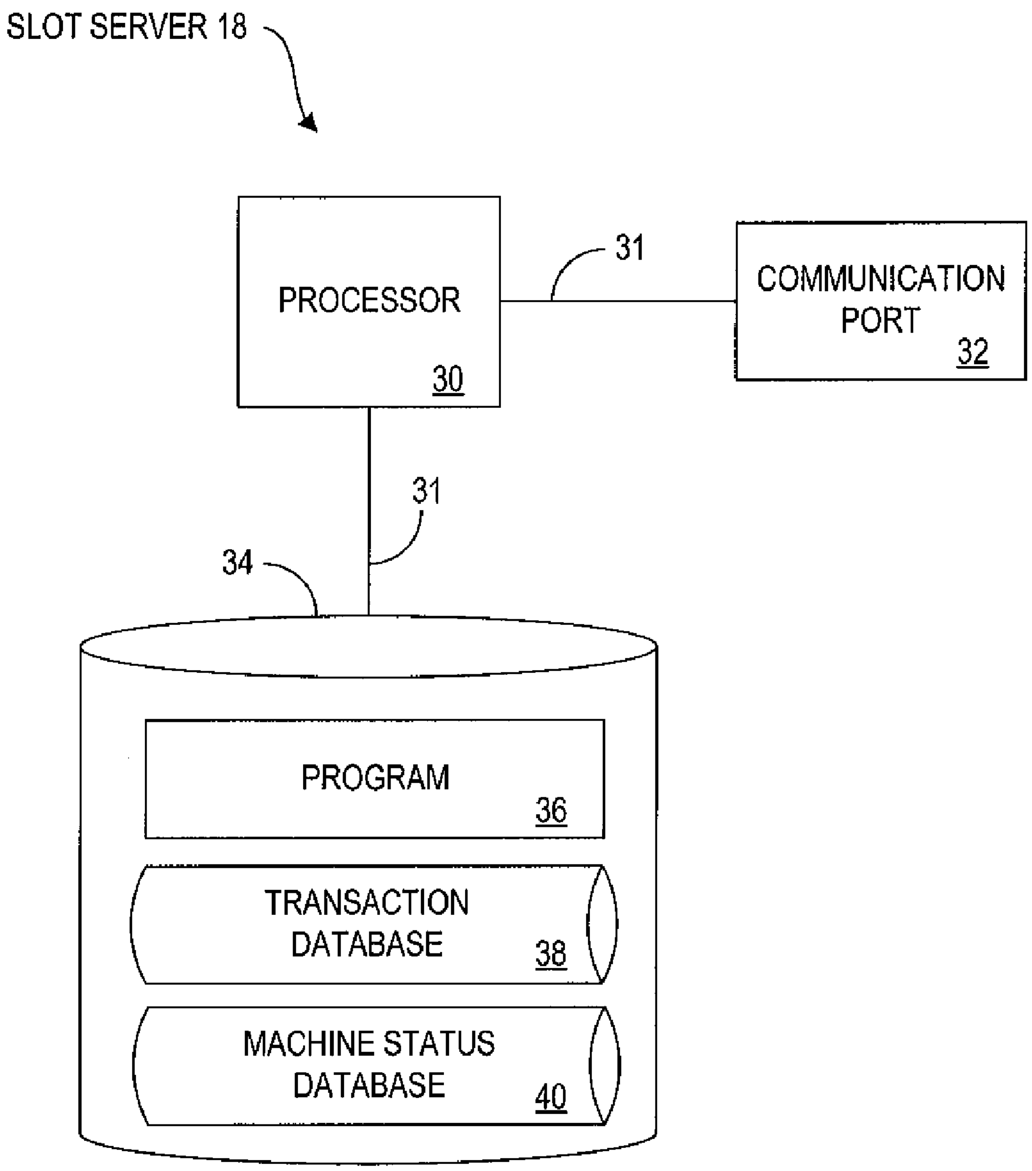
FIG. 3 is a diagrammatic view of the server of FIG. 2.

Referring now to FIG. 3, the basic components of an exemplary slot server 18 are shown to include a processor 30 connected by an appropriate data communications bus 31 to a communications port 32 and a storage device 34. Communications port 32 is selected to be appropriate for the type of communications channel used (communications channel 19 of FIGS. 1 and 2), and in the preferred embodiment would comprise a local area network interface card, many of which are well known in the art.

Storage device 34 comprises an appropriate selection of semiconductor, magnetic and/or optical memory components, many combinations of which are well known in the art. Storage device 34 is seen to contain program code 36 for controlling the operation of slot server 18 in accordance with the processes described below, a transaction database 38 described below with respect to FIG. 8, and a machine status database described below with respect to FIG. 6.

Slot server 18 may comprise one of many commercially known computer systems, for example an IBM AS400™, a DEC Alpha™ server, or the like. Processor 30 and data communications bus 31 would thus comprise appropriate components for the selected system, such system configurations being well known and documented in the art.

Figure 4:
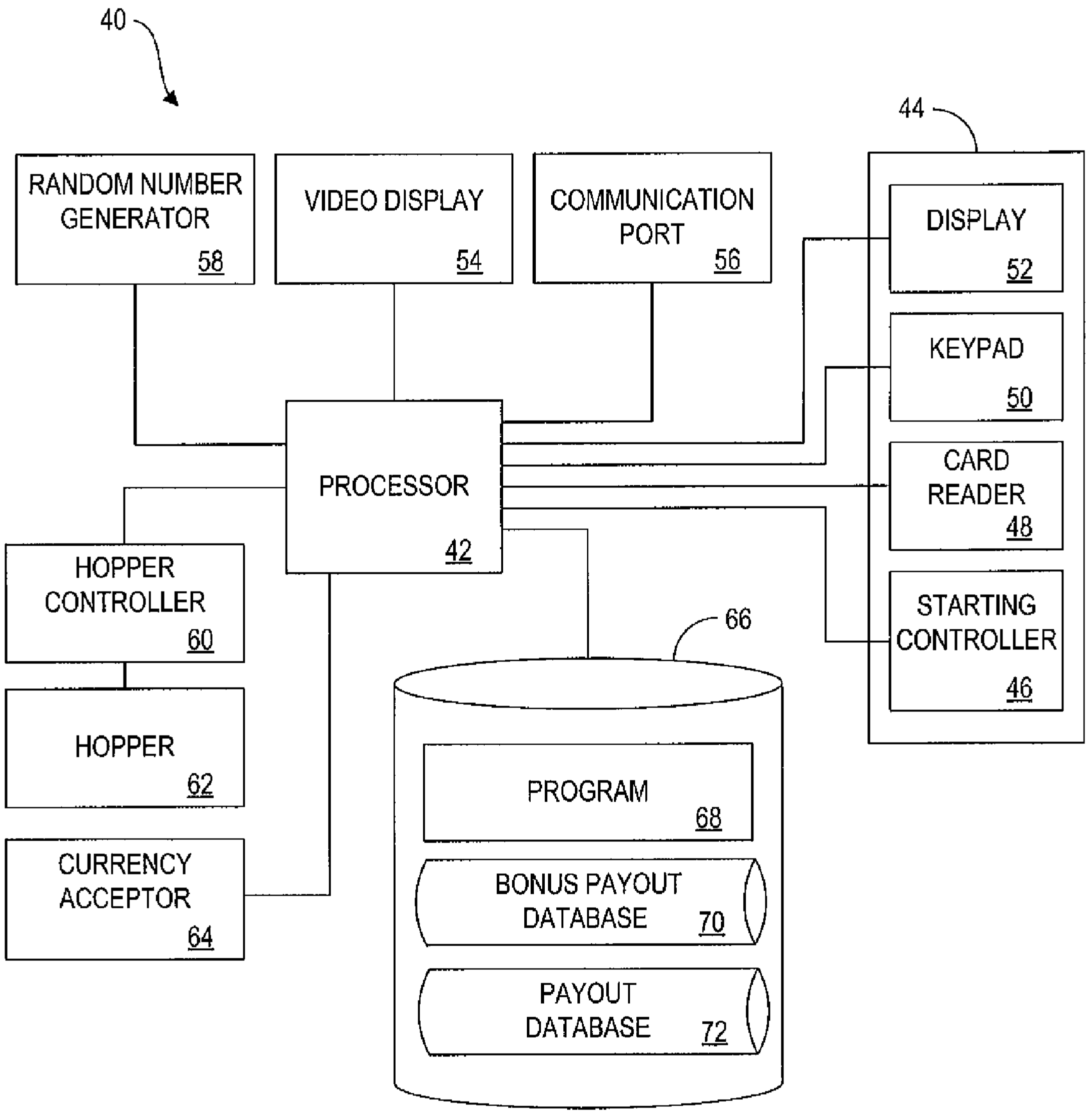
FIG. 4 is a diagrammatic view of a video poker machine in accordance with the present invention.

Referring now to FIG. 4, a block diagram illustrating the key features of a video poker machine 40 is shown. Video poker machine 40, exemplary of an implementation of machines 12, 14, 16 above, comprises a conventional machine with modifications and programming to operate in accordance with the present invention as described herein.

Video poker machine 40 comprises a processor 42 for controlling the operation of the machine, for example an Intel Pentium™ or DEC Alpha™ compatible microprocessor. Processor 42 is connected to an input/output subassembly 44, the subassembly comprising: a starting controller 46, for example a button or lever; a card reader 48 of a conventional type for receiving and reading the data from an encoded player card, for example a magnetically or optically encoded card; an alpha/numeric keypad 50 for receiving player input; and a display 52, for example a light-emitting diode (LED) display for displaying player credits and other player-related information.

Further connected to processor 42 is a video display 54, for example a cathode ray tube (CRT), liquid crystal display (LCD), or LED. Video display 54 is primarily for displaying game results, such as electronic representations of a player’s cards. A communications port 56 is connected to processor 42 for connecting video poker machine 40 to data channel 19 (FIGS. 1 and 2 above). A random number generator 58 is connected to the processor for generating a random or a pseudo-random number to determine an outcome and a payout in a manner described below. Alternatively, the function of generating random or pseudo-random numbers can be incorporated into processor 42.

Further connected to processor 42 are a hopper controller 60 for controlling the dispensing of monies, typically in the form of coins, from a hopper 62 into a coin tray (not shown). A currency acceptor 64 is connected for signalling the processor upon the receipt of currency from a player. A storage device 66 comprises an appropriate selection of magnetic, optical, and/or semiconductor storage mediums in many different configurations well known in the art. Contained in storage device 66 is program code 68 for controlling the operation of video poker machine 40 in accordance with the invention as described below, a bonus payout database 70 described with reference to FIG. 7 below, and a payout database 72 which is conventional in the art.

Figure 5:
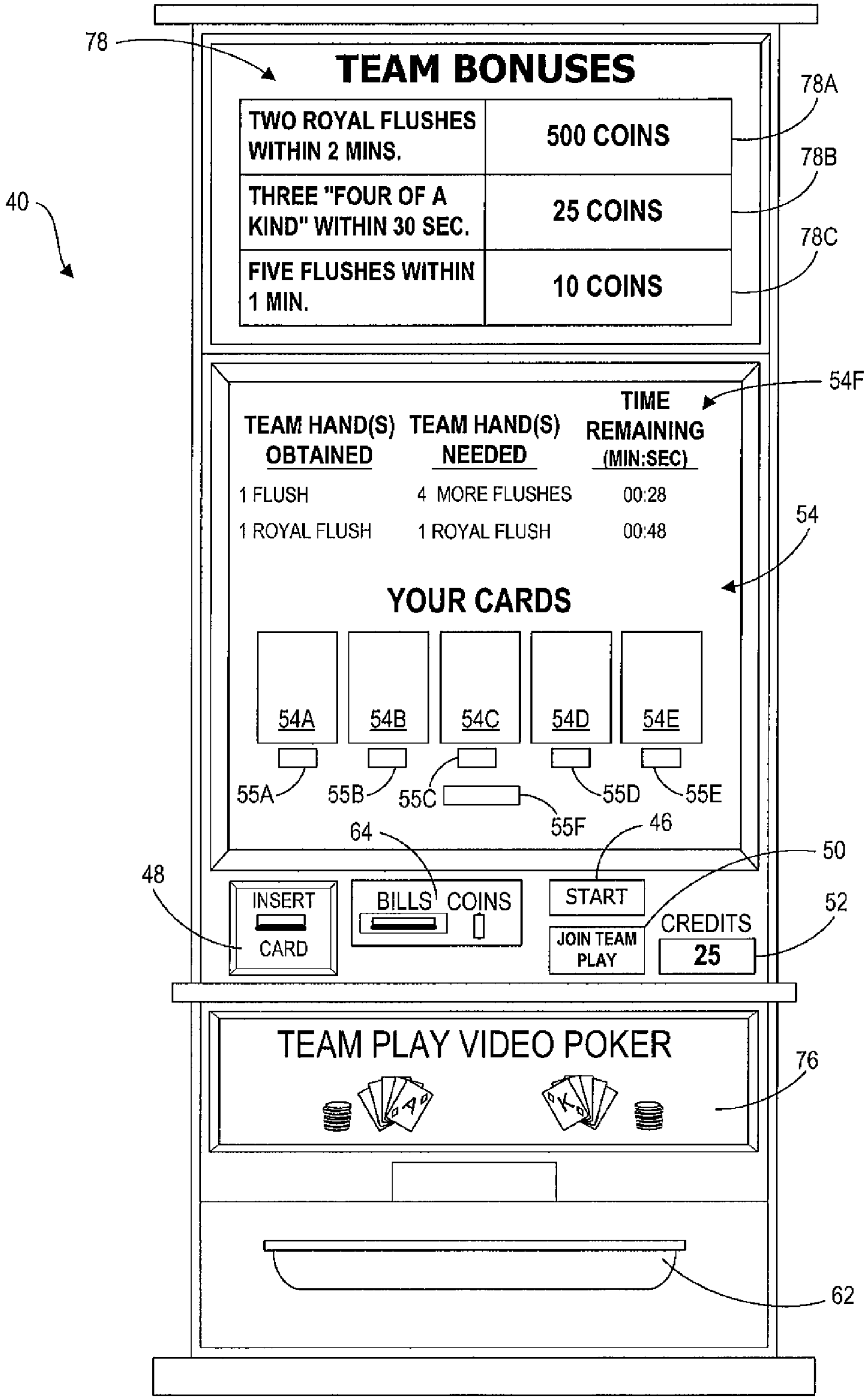
FIG. 5 is a plan view of one implementation of the video poker machine of FIG. 4.

With reference now to FIG. 5 in addition to FIG. 4, a plan view of one exemplary embodiment of video poker machine 40 is shown wherein like elements to FIG. 4 are illustrated by like reference numerals. Starting controller 46 is seen to comprise an electro-mechanical button labeled “START,” while keypad 50 is seen to comprise a single key, labeled “JOIN TEAM PLAY,” which when activated enables a player to input a signal indicating a desire to enter into group play.

Additional elements visible in FIG. 5 include a decorative machine logo 76 identifying video poker machine 40 as a “TEAM PLAY VIDEO POKER” machine, and a team bonus display 78 indicating team play bonus conditions. Team bonus display 78 may comprise a changeable electronic display, or a more permanent display, such as painted glass. As is described in further detail below, a player of video poker machine 40 is eligible to win a team play bonus when the machine is engaged in a team play session, and when preselected bonus conditions occur during a bonus time period.

Visible in team bonus display 78 are three sets of bonus conditions 78A, 78B, 78C. Bonus conditions 78A indicate that when two royal flushes are obtained in total by the team players within two minutes of the initiation of a bonus time period, a bonus of five hundred coins is paid to the player of video poker machine 40. Bonus conditions 78B indicate that when three four-of-a-kinds are obtained in total by the team players within thirty seconds of the initiation of a bonus time period, a bonus of twenty five coins is paid to the player of video poker machine 40. Bonus conditions 78C indicate that when five flushes are obtained in total by the team players within one minute of the initiation of a bonus time period, ten coins are awarded to the player of video poker machine 40. The various bonus time periods are initiated when the first hand that satisfies a bonus outcome, for example a royal flush per the bonus conditions of record 78A, is obtained by one of the team players.

In one embodiment of the invention, as is discussed in further detail below, the bonus conditions change as the number of players on the team changes. The changed bonus conditions are appropriately displayed on the various grouped machines, for example on bonus display 78, as machines are added to or removed from the team.

It will be understood that a bonus payout as described above is in addition to any other payout(s) earned by a player. In the described embodiment of the invention, the bonus payout is the same for each team player. In alternate embodiments of the invention, the bonus payouts may vary amongst the players, for example favoring one or more players who contribute the most to achieving the bonus conditions with a higher payout.

Examining the content of video display 54, there is shown an exemplary display of a team play session. Five locations 54A-E are marked for displaying the results of a video poker hand, i.e. a five card final hand. Five touch-screen buttons 55A-E are provided for use by a player to indicate which cards are to be kept and which cards are to be discarded. A sixth touch-screen button 55F is provided for receiving an input from the player to initiate a deal. As is understood in the art, a final video poker hand comprises the dealt cards, typically five in number, adjusted by the number of new cards dealt to replace cards not held. The illustrated display includes team play information set out in table form in bonus display area 54F indicating that a bonus time period is underway. As illustrated, one flush has been obtained during a bonus time period, with four more flushes necessary within a remaining time of twenty-eight bonus time period seconds to obtain the five flush bonus payout. Additionally, one royal flush has similarly been obtained amongst the team players during another bonus time period, with one more royal flush necessary within a remaining time of forty-eight bonus time period seconds to obtain the two royal flush bonus payout.

Describing the basic operation of video poker machine 40, a player optionally enters his personal, encoded playing card (not shown) into reader 48, whereby he is identified through communications channel 19 to slot server 18. As described above, in an alternate embodiment of the invention the function of slot server 18 is distributed in one or more of the network linked video poker machines. The player enters money into currency acceptor 64 in the form of bills and/or coins, and obtains a number of credits for game plays. This number of credits, typically a multiple of coinage such as quarters, is based on the amount of money entered and the cost per play, and is displayed on display 52.

In one embodiment of the invention, the player indicates that he wishes to participate in group play by pressing "JOIN TEAM PLAY" button 50. Machine 40 is then ad hoc linked, in a manner described in detail below, to other video poker machines for team play. In this embodiment, the player may choose not to engage in team play, and so may engage the same machine in stand-alone play.

In another embodiment, machine 40 is preset for team play. This status is displayed to passersby, for example through an appropriate message on team bonus display 78, such as "THIS IS A TEAM PLAY MACHINE CONNECTED FOR AUTO-PLAY WITH THE BLUE TEAM." Players who use the machine are automatically linked to the other, predetermined team machines for team play.

Returning now to the description of the ad hoc embodiment, subsequent to engaging in team play, the player presses the starting controller 46 to initiate a play. His credits are then debited by the cost of one play. A random or pseudo-random number is obtained from random number generator 58, which is used in a conventional manner to select and display cards in display area 54A-E. Again in a conventional manner, the player may interact with the machine, typically by pressing buttons 55A-E, to indicate which cards he is holding, and which cards he is discarding for a draw.

Using one of many processes well known in the art, video poker machine 40 operates to select and display drawn cards. Such processes can include, for example, using cards identified based on the first random number to fill the draw, or selecting a new random/pseudo-random number to identify fill cards. The resulting final hand is used to access a payout from payout database 72. The player's winnings, if any, are reflected in the credits shown in display 52.

In accordance with the present invention, if a particular final poker hand (i.e. the hand resulting from the draw) results in a bonus condition, in this case a royal flush, a four-of-a-kind, or a standard flush, video poker machine 40 initiates a bonus mode of operation. As will be described in further detail below, a bonus time period is initiated, and an announcement of the bonus mode is made to the linked, team machines through transmission of data via communication channel 19 and display of bonus information in bonus display area 54F. Team players then play cooperatively to win a bonus by operating their machines using strategies selected to achieve the requisite number of bonus hands required to win the team bonus.

Referring now to FIG. 6, there is shown a table illustrating exemplary contents of machine status database 80. Machine status database 80 is seen to include four records 82A-D, each record including three fields: a machine identifier field 84 containing a code identifying a video poker machine, a status field 86 indicating the play status of the identified machine as "available" for team play, currently "active" in another team and thus unavailable for team play, or "unavailable," i.e. the machine is not currently in play or is in play by a player who has not selected team play, and is thus unavailable for team play, and a team field 88 identifying the team for those machines active in team play. Machine status database 80 may optionally be omitted from the embodiment of the invention wherein team machines are pre-linked, with the status of the machines associated with a particular team being maintained in the transaction database described below.

Referring now to FIG. 7, there is shown a table illustrating exemplary contents of bonus payout database 90. Bonus payout database 90 is seen to include three records 92A-C, each record illustrating an exemplary set of bonus conditions that need to be satisfied in order to earn a bonus payout amount. Each record includes five fields: a number of players field 94 identifying a number of players necessary to satisfy a bonus payout condition, a bonus hand field 96 indicating a bonus outcome—in the present embodiment a required rank of poker hand—necessary to satisfy the bonus payout condition, a required quantity field 97 indicating the required number of ranked hands necessary to satisfy the bonus payout condition, a time limit field 98 indicating a bonus time period within which the team players must obtain the required number of ranked hands to satisfy the bonus payout condition, and a payout field 100 indicating the amount of the bonus payout if the set of bonus conditions in a given record is satisfied.

Examining, for example, record 92A of bonus payout database 90, a set of bonus conditions are seen to include the requirement that, amongst five players, one additional royal flush must be obtained within a one hundred and twenty second time window following the occurrence of a first royal flush on one of the linked team machines, for a total of two royal flushes. If the bonus conditions are met, the player receives a bonus payout of five hundred coins. Records 92B and 92C indicate similar information for other bonus opportunities. The bonus conditions contained in records 92A, 92B, 92C are seen to correspond to those displayed in machine display areas 78A, 78B, 78C, respectively.

In another embodiment of the invention, the number of players defined in field 94 comprises a range of players, for example five-to-ten players, for a given set of bonus conditions. With such a range of players defined, a subset of players may enter into and drop from group play without any change in the bonus conditions for the ongoing players.

In the illustrated embodiment of the invention, each player on a team receives the same bonus payout if the bonus conditions are met during team play. In other embodiments of the invention, the bonus payout is biased to provide a larger payout to a selected one of the team players. In one such embodiment, a player receiving the hand that initiates the bonus play conditions receives a higher bonus payout than the other team players if the bonus conditions are fulfilled. In another such embodiment, a single player who obtains a majority of the hands necessary to fulfill the bonus conditions receives a higher bonus payout than the other players. In yet another such embodiment, a single player who obtains all of the hands necessary to fulfill the bonus conditions receives a higher bonus payout than the other players, or under such circumstances may receive the only bonus payout resulting from meeting the bonus conditions.

It will be appreciated that many combinations of outcomes, time periods, and payouts may be selected. Such combinations are selected in a straight-forward manner dependent on the likelihood of the outcomes while maintaining a desired house (i.e. casino) advantage. As is well known to those skilled in the art, slot machines are operated at a house advantage, typically as selected by the casino and approved by a state regulatory agency, sufficient to provide the casino a profit from the operation of the machines.

In the illustrated embodiment of the invention, different sets of bonus conditions are provided for different numbers of linked, team play machines, i.e. four machines (conditions 92B) or five machines (conditions 92A, 92C). It will be understood by those skilled in the art that numerous other bonus conditions may be provided to facilitate play by teams of many different sizes. Such bonus conditions are selected, according to well known principles, to motivate team play while maintaining an appropriate house advantage. Preferably, the bonus conditions active for a given number of players are transmitted to video poker machine 40 for display in display area 78 (FIG. 5).

In yet another embodiment of the invention, features are provided whereby one or more players may purchase an extension(s) of the bonus period time for themselves and/or for the group. Players may be provided, for example, the option to buy more bonus play time for one dollar per player per bonus minute. The number of players electing to continue bonus play would affect the payout in the manner described above.

Referring now to FIG. 8, a table illustrating exemplary contents of transaction database 110 is shown, the database including information indicating which machines are currently linked for team play. The transaction database is seen to include three records 112A, 112B, 112C, each record including six fields: a team identifier 114 identifying a specific team; and entries for identifying up to five machines 116, 118, 120, 122, 124 currently part of the team. It will be understood that while the invention has been illustrated with up to five machines per team, any number of machines greater than one may be selected. Unfilled machine slots in any particular team record are indicated as "open."

In the illustrated embodiment of the invention, machines are added and/or removed from team play on an ad hoc basis by the players, such status similarly being reflected in machine status database 80 and transaction database 110. In the alternate embodiment wherein machines are pre-linked for team play, the machines enabled for team play are set and left in team play mode for an extended period of time, their identifiers thus being added to transaction database 110 for that extended period of time. In this alternate embodiment, a machine that is pre-linked but not currently in play would be identified in transaction database 110, for example, with an entry of "machine identifier/out of play." The "out of play" indicator would be deleted when the machine was engaged in play. Bonus conditions would be adjusted based on the number of active team players.

Figure 9:
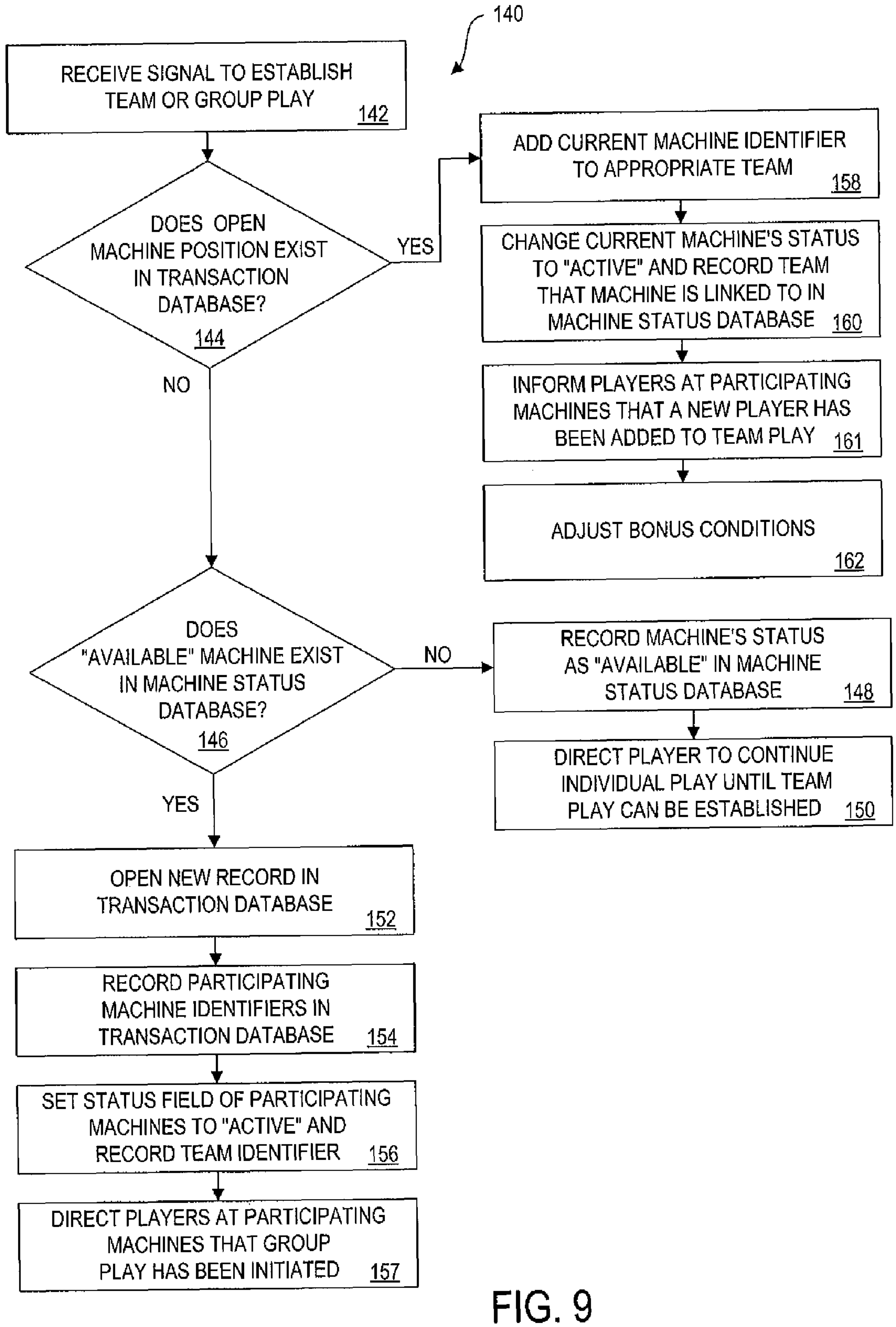
FIG. 9 is a flowchart illustrating a process of linking slot machines for group play.

With reference now to FIG. 9, a process 140 is shown for electronically identifying and linking video poker machines for team play. The process is performed by slot server 18 in the embodiment of FIG. 1, or by one or more programmed video poker machines in the embodiment of FIG. 2. It will be appreciated that video poker machines such as machine 40 of FIG. 4 typically contain a processor and memory, and are programmable to operate in accordance with the present invention.

In the described embodiment of the invention, each new player to video poker machine 40 is provided the option to engage in group play by pressing "JOIN TEAM PLAY" button 50. Server 18 then operates in accordance with the process set out in FIG. 9 to ad hoc engage the machine in team play. If the machine is not in play, or a player actively chooses not to engage in team play, the status in machine status database 80 indicates "unavailable." As described below, if a player chooses to engage in team play, but a team is not available, the status in machine status database indicates "available." If the machine is engaged in team play, its status is reflected in the machine status database as "active."

In the alternate embodiment of the invention wherein machines are pre-selected for team play, a machine is pre-set to play in a selected group. It remains a group play machine in that pre-selected group until it is reset by the server pursuant, for example, to a time-out condition. In this alternate embodiment, the status of the machine is reflected in the transaction database as described above.

Process 140 is initiated by the receipt of a signal from video poker machine 40 requesting the establishment of team play (step 142). Such a signal is generated by, for example, player operation of "JOIN TEAM PLAY" button 50 (FIG. 5). The signal would include the machine identifier as described above. In an alternate embodiment, the signal would include an identifier of the team that the player wishes to join. Team information would be provided to a player, for example, by displaying a list of teams having positions open for additional players, including active team players (if such player information is available). A player may also be provided with a search capability to search stored team data to identify teams having particular members. In yet another embodiment, a player is provided with the opportunity to select between teams playing in accordance with different bonus conditions.

A signal indicating a selected team may be received from the player via a conventional input device such as a keypad or touchscreen.

Upon receiving the request to join team play, slot server 18 functions to access transaction database 110 to determine if an open machine position exists in any of the established teams (step 144). If no machine position is open in an established team, slot server 18 functions to access machine status database 80 to determine if any available machines are indicated therein (step 146). If no positions exist in established teams, and no machines are available to form new teams, then the requesting video poker machine is identified as "available" in the machine status database (step 148). A message is transmitted to the machine for display to the player indicating that team play is not available, and the player should continue individual play until the requisite number of other machines are available to form a team, or a position becomes open within an established team (step 150).

If, upon checking for other available machines in step 146 such an available machine is found, then a new record is opened in transaction database 110 (step 152), a new team identifier is generated by the server to track the new record, and the participating machine identifiers are recorded therein (step 154). That is, the initial requester and the found available machine are linked to form a new team. The status of these participating machines in the newly formed team is set to "active" (step 156) in machine status database 80. If the minimum requisite number of players as defined by the bonus conditions are available for team play, the players are informed that they have engaged in group play through the transmission and display of an appropriate team play message (step 157). Otherwise, the team entry is established in the transaction database, but team play is not established and players are not notified until the requisite number of machines are networked for that team. As will be appreciated, based on the illustrated bonus conditions set out in bonus payout database 90 (FIG. 7), at least four machines are necessary to establish team play in the described embodiment; that is, a minimum of four machines are necessary to be eligible for the three four-of-a-kind bonus.

If, upon checking for an open position in step 144 such an open position is found, then the current machine identifier is added to the appropriate team in transaction database 110 (step 158). In machine status database 80, the machine status is changed to "active," and the team identifier with which the machine is linked is entered into the team field (step 160). Appropriate signals are transmitted to the players participating in the team that a new team player has been added (step 161). As is necessary depending on the bonus conditions defined for team play, the bonus conditions are updated to reflect the changed number of players, and transmitted for display to the various team machines (step 162).

In one embodiment, the messages to the various team players contain information identifying the other linked team players so that they may identify one-another. Such information can comprise, for example, displayed machine numbers for the grouped machines, the machine numbers displayed in a selected graphical display area on each machine. In another embodiment, where players are identified to server 18 through the use of a player slot card, the players names may be transmitted and displayed on each of the linked, team play machines.

To complete this process for establishing slot machine teams, slot server 18 establishes network communications amongst the linked machines via communications channel 19, and team play is thus enabled. A detailed description of team play is set out below with reference to FIG. 11.

Figure 10:
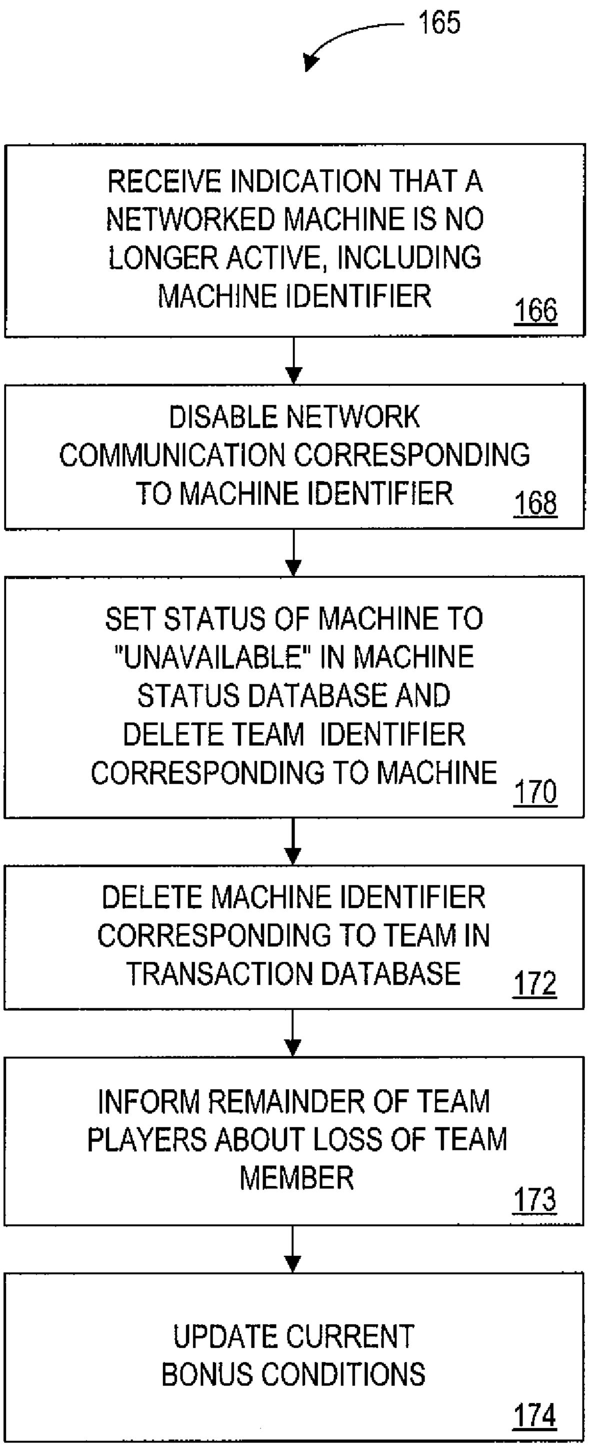
FIG. 10 is a flowchart illustrating a process of removing a networked slot machine from group play.

Referring now to FIG. 10, a process 165 is shown whereby a slot machine is removed from team play. Such a process may be initiated by the occurrence of several different conditions, including: cessation of play by a player; a pre-determined time of inactivity at a machine; a signal provided by a player requesting termination of team play; and/or termination of team play by other team players such that a requisite number of team players becomes unavailable. In the embodiment where machines are pre-linked for team play, a specific time of day may be provided at which the machine is preset to initiate and/or terminate team play. Other conditions upon which it is desirable to initiate and/or terminate team play will now be obvious to those of ordinary skill in the art.

Upon initiating a process to terminate team play, the video poker machine sends a signal to slot server 18 indicating that it is no longer in active play (step 166). The server then functions to disable network communication for that inactive machine (step 168), set the status of the machine in the machines status database to "unavailable," and delete the team identifier from the corresponding field in that same database (step 170). The machine identifier is deleted from the appropriate team record in transaction database 110, with that machine position then showing as "open" in that database (step 172). The remaining players are informed through an appropriate transmission and display of data that the team includes one less player (step 173). If the change in the number of team players results in a change in the bonus conditions as shown in bonus payout database 90 (FIG. 7), the changed bonus conditions are transmitted to the various networked machines for appropriate display.

It will be understood that, should enough players on a team terminate team play, the remaining number of team players may be insufficient to satisfy any team bonus conditions. Under such circumstances, the server will notify the remaining players that team play is not currently available, and initiate the team formation process described above. This will result in either the adding of available new players to the team, or the joining of the newly available team players to other established teams.

In the embodiment of the invention wherein machines are pre-selected for team play, machines are added and/or dropped from team play only as players engage or disengage play on the pre-selected machines. No ad hoc teams are formed. Bonus conditions are adjusted as necessary to reflect changes in players.

Figure 11A:
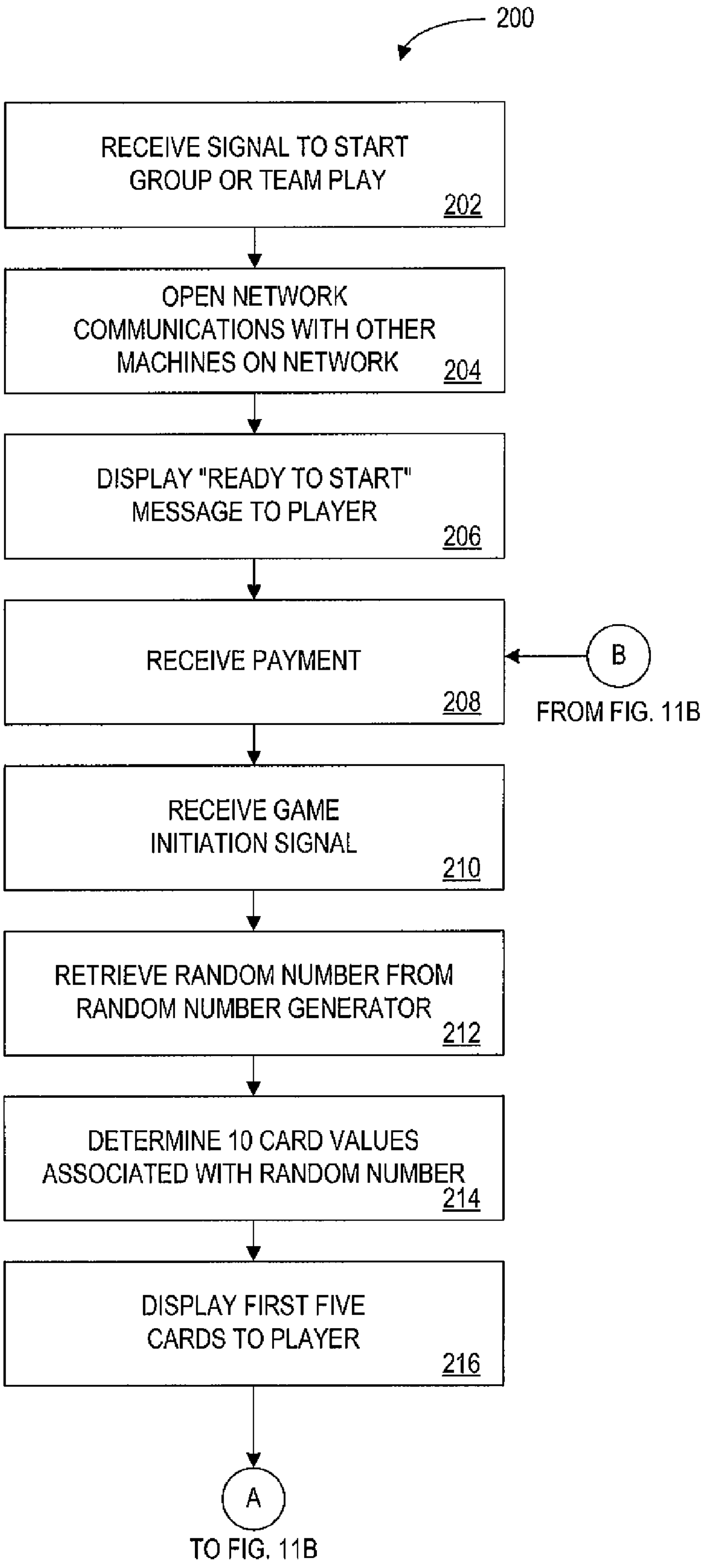
FIGS. 11A-C together comprise a flow chart illustrating a process of group play of video poker machines in accordance with an embodiment of the invention.
Figure 11B:
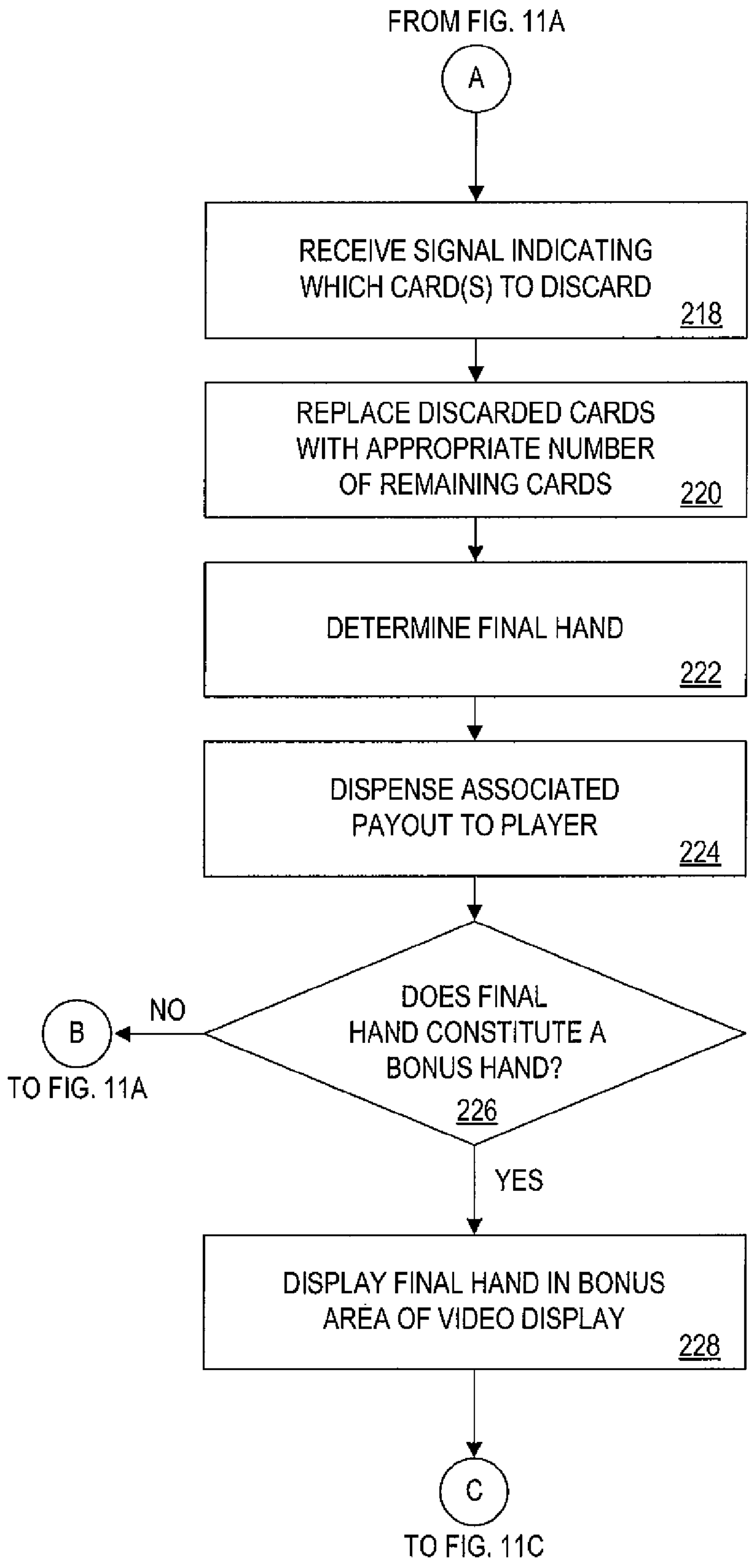
Figure 11C:
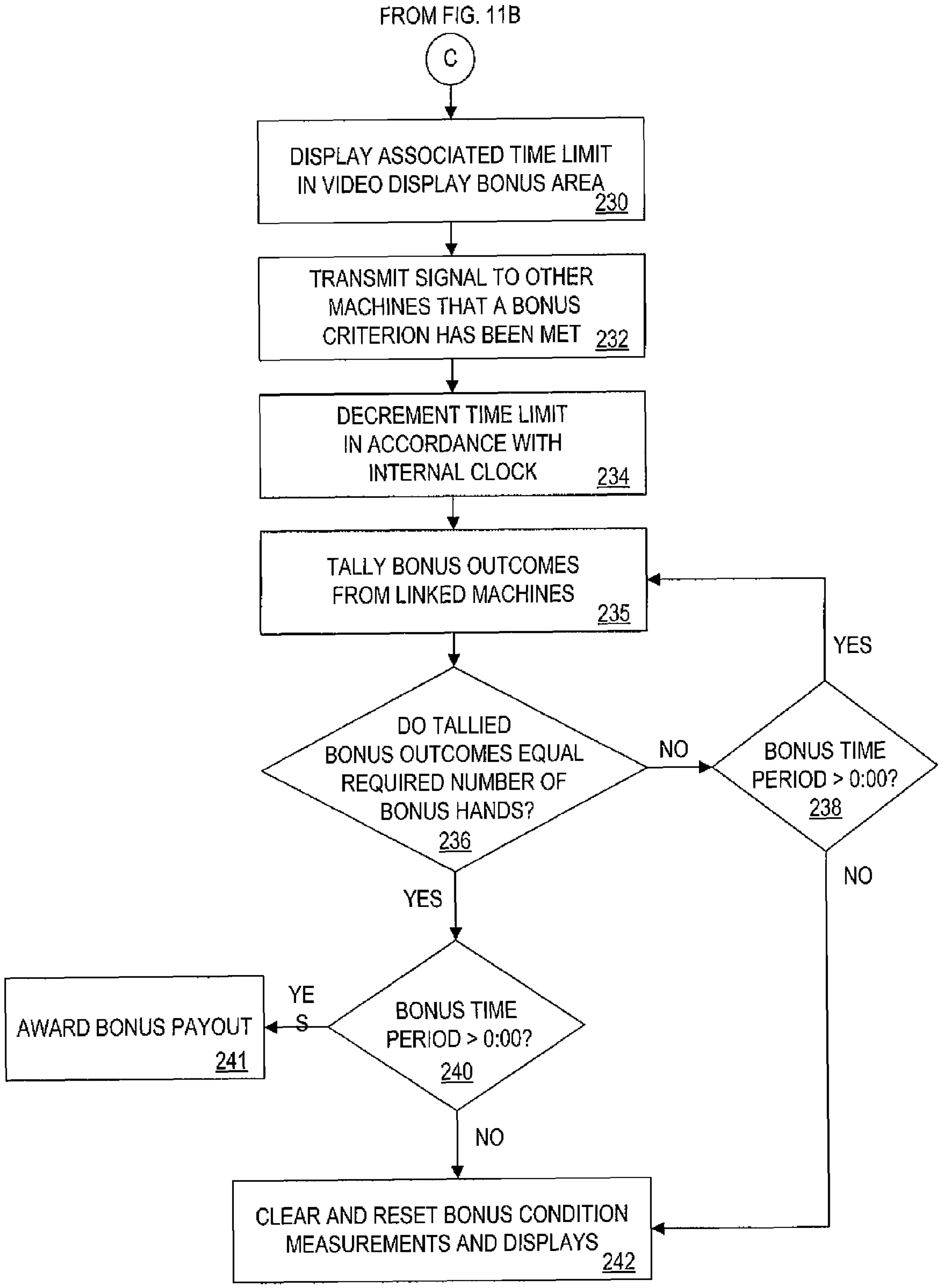

Referring now to FIGS. 11A-C, there is shown a process 200 for the playing of team video poker on a video poker machine in accordance with the present invention. To initiate the process, a player of video poker machine 40 (FIGS. 4 and 5) presses button 50 to transmit to the video poker machine and subsequently to slot server 18 (FIG. 3) a signal to begin team play (step 202). Video poker machine 40 then opens communications with the multiple networked video poker machines (step 204) identified for team play, the team machines having been established with respect to FIG. 9 above. Subsequent to the linking of the machines to enable team play, an indicator is provided to the player that the machine is enabled for team play (step 206). Such an indication may be, for example, by the display of a "ready to start" message on the video display of the machine, or by changing the color of the "join team play" button.

Payment is received from the player (step 208), followed by a game initiation signal (step 210) upon the player's operation of "start" button 46. Video poker machine 40 retrieves a random number from random number generator 58 (step 212), and processes the random number to select ten playing card values (step 214). The first five cards are then electronically 'dealt' to the player by display in areas 54A-E on display screen 54 (step 216).

With reference now to FIG. 11B, the video poker machine receives from the player signals indicating which card(s) the player chooses to hold (and thus which cards are to be discarded) (step 218). Such signals are generated by the player operation of buttons 55A-F in a conventional manner.

Once identified, the discarded cards are replaced with an appropriate number of the remaining cards from the originally selected ten cards (step 220) to determine the final hand (step 222). A payout is dispensed to the player in accordance with the rank of the final hand (step 224). The value of this payout is determined in a conventional manner, typically using the payout table as described above.

In accordance with the present invention, the video poker machine then enters into a bonus mode of operation wherein a test is performed to determine if the most recent final hand matches any of the bonus hands from field 96 of bonus payout database 90 (FIG. 7) (step 226). In the present example, as described above with respect to the bonus payout database, bonus hands are defined as royal flushes, four-of-a-kinds, or regular flushes. If no bonus hand is detected, i.e. no flush or four-of-a-kind, then repeat play continues with step 208. If a royal flush, a regular flush, or a four-of-a-kind is detected, then it is indicated as a "bonus hand obtained" in bonus display area 54F of video display 54 (step 228).

It will be appreciated that, pursuant to the discussion above, in alternate embodiments the payouts resulting from meeting the bonus conditions may vary depending on the number of machines engaged in team play. For example, if two players are engaged in team play, the payouts may be lower than the payouts provided for a team of five players. Alternatively, the required number and/or rank of bonus hand(s) may be changed depending on the number of players.

Continuing with reference to FIG. 11C, once a bonus hand is identified, the system clock (FIG. 4) is initiated for the periods of time set out in field 98 of bonus payout database 90: i.e. one hundred and twenty seconds to obtain two royal flushes, 30 seconds to obtain three four-of-a-kinds, and 60 seconds to obtain five regular flushes. The bonus time period is displayed in the "time remaining" portion of bonus display area 54F (step 230). Substantially simultaneously, to establish team play, the bonus information identifying the bonus hand and the bonus time period are transmitted to the linked, team machines (step 232) for display in the bonus display area. The bonus time period is then decremented in a 'count down' manner (step 234), with the countdown being displayed on each of the linked machines.

As the bonus time period counts down, bonus outcomes that occur on all of the linked machines are collected and totalled, the total being displayed on all of the linked machines in the bonus display area (step 235). If a bonus outcome occurs during the bonus time period, it is tested to determine if it completes the required number of bonus outcomes as defined in field 97 of bonus payout database 90 (FIG. 7) (step 236). If it does not complete a required bonus outcome, then it is determined whether the bonus time period is still active, i.e. has not decremented to zero (step 238). If the bonus time period is still active, the system continues collecting and tallying bonus outcomes per step 235. If the bonus time period has expired, then the bonus display area is cleared until another bonus hand results amongst the team players (step 242).

It will be appreciated that, during the bonus time period, players will be encouraged to play in an interactive, team environment, playing as quickly and effectively as possible to achieve the bonus results. Because the play outcomes of each player contribute to the potential bonus award to all of the players, the players will find themselves participating as a team, where each individual contributes to the good of the whole. This will attract players desiring a team environment. It may even encourage players to sacrifice potentially higher individual outcomes to achieve a team bonus outcome. For example, a player may be tempted to break up a pair or a three-of-a-kind in order to attempt to obtain a required number of bonus hands such as flushes or royal flushes.

If the test at step 236 indicates that the required number of bonus hands have been achieved, then the clock is again tested to determine if the bonus time period is active (step 240). If it is active, then an appropriate bonus payout is made to each team player per payout field 100 of the bonus payout database (step 241). If the bonus period is expired, then as above the bonus display area is cleared until another bonus hand results amongst the team players (step 242).

While the above embodiment of the invention is illustrated with respect to the operation of video poker machines, the invention is equally applicable to other types of slot machines.

With respect to a reel slot machine, in lieu of a video poker outcome, the bonus conditions comprise the obtaining of one or more predefined reel outcomes within the bonus time period. For example, a first bonus condition may comprise the team achieving three "cherry-cherry-cherry" outcomes within a two minute time period, while a second bonus condition may comprise achieving two "bar-bar-anything" outcomes within a one minute period. It will be appreciated that many combinations of bonus conditions and payouts may be selected in a conventional manner based on the likelihood of the results and the desired advantage for the casino.

With respect to bingo machines, in lieu of a video poker outcome or slot reel outcome, bonus conditions may be defined in terms of specific row, column, and/or diagonal bingo results. With respect to keno, bonus conditions may be defined in terms of minimum quantities of player selections matching drawn numbers.

There has thus been provided a new and improved system and method for providing linked, team play options for what have been traditionally stand-alone play slot machines. The invention introduces the concepts of team play and social interaction into such games, with the intended result of increasing the player pool to include those who enjoy such social interactions. The invention has application to all slot machines, including video poker machines, conventional slot machines, bingo machines, and the like. It is applicable to commercial gaming machines and environments, with the result of improving the player experience, increasing the player pool, and increasing the profitability of such games to their owners.

In one or more embodiments, a bonus period may be extended by some amount of time for every winning outcome obtained by a team member, even if such an outcome is not one of the bonus outcomes. Thus, a player may extend a bonus period by three seconds for achieving an outcome of two pair, even though the outcome does not result in a bonus payout.

In one or more embodiments, after a bonus time period has begun, two or more team members may form an outcome in conjunction with one another. An outcome may comprise a first card from a first player's hand of video poker and a second card from a second player's hand of video poker. For example, a team outcome of a royal flush may include two cards from a first player's latest hand of video poker, and three cards from a second player's latest hand of video poker. When several team members can contribute to a bonus outcome, such as a royal flush or four-of-a-kind, the outcome is more likely to be achieved by the team. Therefore, a team may experience a greater frequency of bonus payouts when multiple team members may contribute to bonus outcomes. Accordingly, bonus conditions may be activated when any team member receives a triggering outcome individually (e.g., when any team member individually receives a royal flush). However, once a bonus time period has been initiated, team members may receive bonus payouts for jointly created outcomes that satisfy bonus conditions. In some embodiments a bonus time period may also begin based on the occurrence of a jointly created outcome (e.g., a four-of-a-kind comprising cards contributed by multiple team members).

In various embodiments, a bonus period may become activated when a predetermined number of team members are playing. For example, when at least six team members are playing, a bonus period may become activated. In various embodiments, a bonus period may become activated when: (i) the aggregate number of pulls made by all members of a team per unit time exceeds a predetermined threshold; (ii) the aggregate amount of wagers for a team per unit time exceeds a predetermined threshold (e.g., the team as a whole is wagering more than $5 per minute); (iii) the rate of play of a predetermined number of team members exceeds a predetermined threshold (e.g., at least five team members are making more than ten handle pulls per minutes); and so on. In general, the activation of a bonus period may be a benefit provided to a team by a casino in return for the team providing the casino with a desirable amount of business (e.g., a desirable number of wagers made per hour, etc.).

In various embodiments, a bonus period may be initiated when a special card is dealt to any one or more of the team members. For example, when any two team members are dealt the ace of spades within ten seconds of one another, a bonus period may become active. In some embodiments, a special card may be added to the decks used in team members' video poker games. The special card may have a face reading "Bonus Period Card," or the like. When the card is dealt to one or more of the players, a bonus period may take effect. The bonus period may last for a standard amount of time, or may last for an amount of time printed on the special card. The card itself may or may not serve as an actual game indicia in a hand of video poker. If it does, it may serve as a wild card.

In some embodiments a bonus period may entail each team member receiving a benefit based on a payout received by any other team member during the bonus period. For example, if a bonus period is in effect and a first team member receives a flush outcome (for a payout of six coins), then all other members of the team may also receive payouts of six coins. In some embodiments, payouts received by other team members may be only some fraction of that received by a team member who actually obtains the winning outcome.

In some embodiments, a team may receive enhanced benefits if a threshold number of team members plays at least a certain minimum number of coins per handle pull.

For example, a team may receive enhanced benefits if each member of the team plays the maximum allowable number of coins on each handle pull. Such enhanced benefits may include larger payouts to the team for the achievement of bonus outcomes. The larger payouts may even be proportionally larger (e.g., larger in the sense that the ratio of bonus payouts to average team wager amount is larger when the average team wager is max coins). Enhanced benefits may encourage members of the team to make larger wagers, and to thereby provide the casino with more business.

In various embodiments, five members of a team may each play at their own separate gaming device. The five members of the team may engage in a joint game in which each receives only a single card of a five-card hand of video poker. Each team member may then decide whether to hold or to discard the card he has been dealt. Once each team member has made his decision (e.g., by pressing a "hold" or "discard" button), the final hand may be dealt. The final hand may be dealt by replacing, for each team member that chose "discard," the card on the team member's display screen with a new card. If the final hand (formed from the five cards on the five team members' screens) is a winning hand, then each team member may receive a corresponding payout. The present embodiments may be especially enjoyable for a team because all team members get to play in the same game together. Further, a good deal of cooperation may be required since teams would most benefit by forming a coordinated strategy, as opposed to having each team member make an independent choice as to whether to keep or discard his own card. Accordingly, team members would have many opportunities to converse and interact.

In the game described above, in which each member of a five-person team receives a single card, the entire five-card hand of video poker may nevertheless be displayed on the screen of each team member's gaming device. For example, each team member may see his own card writ large, and may see the entire hand of video poker displayed in a smaller size at the bottom of his display screen. In this way, team members could more easily discuss a team strategy without first having to ask what cards the other team members hold. In various embodiments, prior to the start of a game, each team member places a single wager at his/her gaming device. At the end of the game, each team member receives a payout that is an appropriate multiple of the original wager and which is based on the final hand of video poker achieved by the team. For example, a team member may make a wager of one dollar prior to the game. The team may then play the game and receive three-of-a-kind. Using a typical 9/6 Jacks-or-Better payout structure, the team member may receive three dollars payout for the three of a kind. Now, conceivably, each team member may make a wager of a different size. Therefore, on a given game a first team member may make a wager of fifty cents and receive a payout of $1.50, while a second team member may make a wager of $3.00 and receive a payout of $9.00. In some embodiments, payouts may be couched in terms of team payouts. For example, if every team member makes a one-dollar wager, then a team payout may be $5.00 for a pair, jacks or better, $10.00 for two pair, $15.00 for three-of-a-kind, and so on. Team members may thus feel more like high-rollers in that they are playing for larger payouts, even though the portion of the larger payouts going to any one team member would equal a standard payout.

In various embodiments, team members may vote on strategies to be used during a game. For example, each of three team members may see the same five cards dealt to the team in a team game of video poker. Each team member may make a selection as to whether to hold or discard each of the five cards. For each card, the server may receive an indication of the votes from each team member's gaming device, and may tally up the votes for "keep" or "discard." Cards receiving a larger number of votes for "keep" may be kept, while cards receiving a larger number of votes for "discard" may be discarded. Tie votes may be broken through random selection by the server, or through selection of the option most beneficial to the team in terms of expected winnings, or in terms of some other metric.

In some embodiments two or more different ways of playing a hand are presented to team members, and the team members vote only on which way they prefer. Thus, rather than voting on whether to keep or discard each individual card in a hand, team members may vote on, e.g., whether to "keep the pair" or whether to "go for the flush". In other words team members may vote on strategies, where each strategy encompasses decisions on what to do with each card in a hand. The strategies presented to team members may be determined by the server or by individual team members. For example, a team member may receive at his own gaming device a five-card hand. The team member may then determine a strategy by selecting cards to discard and/or selecting cards to keep. The team member may then put his strategy up for a vote by pressing, e.g., a "submit for vote" button on his gaming device. The team member's hand and strategy may then appear displayed on the gaming devices of his fellow team members. The fellow team members may then approve or disapprove of the strategy. If the approvals are in the majority, then the gaming device of the team member may act based on the strategy by, e.g., replacing all the discards with new cards. If disapprovals outnumber approvals, then the team member may modify his strategy and submit a new strategy to his fellow team members.

When a strategy selected by a first team member is displayed on the gaming device of a second, the strategy may be indicated in several ways. Cards selected by the first team member to discard may be presented in darker or grayer colors. Cards selected for discard may be centered along a line slightly below the line along which cards to be kept are presented. Cards to be kept may be underlined or highlighted. Of course, such a display mechanism may also apply when strategies are determined by the server. Thus, in various embodiments, a strategy for video poker may be determined by a first person or entity, and may be presented for a vote of approval to members of a team. If the vote is for approval, then the strategy may be carried out.

In some embodiments a team may have a captain or other specially designated member. The team captain may have a number of responsibilities or privileges. Among them: (i) the team captain may make the final decision as to whether or not to proceed with a given strategy in a team game; (ii) the team captain may have a view of games being played by other team members (e.g., the team captain may be able to see the cards of other team members displayed on his display screen); (iii) the team captain may provide advice to other team members; (iv) the team captain may have the ability to make game selections at his gaming device that affect games being played at other gaming devices (e.g., the team captain may select, at his gaming device, cards from another team member's hand to be discarded, after which the gaming device of that other team member will discard the cards and replace them with new cards); (v) the team captain may have veto power over decisions made by other team members (e.g., the team captain may override the decisions and provide his own decisions); and so on.

In various embodiments not involving team play, a first player may allow second player to make decisions for him and/or to override the first player's decisions. The first player may be a novice, for example, and appreciate the security that comes from having his friend (the second player) review his strategic decisions.

In one or more embodiments, during the start of a game, each member of a team is dealt an independent starting hand of video poker. However, each team member may have displayed on his gaming device an indication of the other team members' hands. After the starting hands have been dealt, the team may choose one of the starting hands. For example, the team may vote on a starting hand. The chosen hand (e.g., the hand receiving the most votes), may then become the starting hand for each team member. That is, the starting hand originally dealt to each team member is now replaced with the hand that was chosen from amongst all the team members' starting hands. In this way, for example, each team member may now start with the best hand from among all the starting hands dealt to the team members. Once each team member has received a copy of the chosen starting hand, each team member may play out the hand independently.

For example, suppose three team members are playing video poker at three separate gaming devices. A first team member is dealt the: 3c 4d 7s Jh Kd. A second team member is dealt the: 8h 9d 2s 6c Qh. A third team member is dealt the: 5h 5s 5c 10s Qd. The team members may then vote to select one of the three starting hands to be used by each team member. According to most conventional standards of poker play, the third starting hand is the best, as it contains three 5s, or three of a kind. The hand further has the potential to improve to four-of-a-kind, or to a full house. Thus, the three team members unanimously vote to select the third hand. Each team member than has the third hand displayed on his gaming device. The first team member then plays out the hand by discarding the 10s Qd and receiving the 8c 3h, for a final hand of: 5h 5s 5c 8c 3h, or three-of-a-kind. The second team member then plays out the hand by discarding the 10s Qd and receiving the Ks Kd, for a final hand of: 5h 5s 5c Ks Kd, or a full-house. The third team member then plays out the hand by discarding the 10s Qd and receiving the Jh 5d, for a final hand of: 5h 5s 5c Jh 5d, or a four-of-a-kind. Note that each team member has independently played out the same hand, as from a different deck. As a result, the three team members have finished with three different outcomes. However, each team member has still benefited from being able to start with the best starting hand from among all the team members. In various embodiments, a team need not vote on which starting hand is to be used by each team member. Rather each team member may select the starting hand he desires from among the starting hands achieved by all the team members.

Various related embodiments may allow an individual player (e.g., a player who is not part of a team), to receive several choices of a starting hand, to select one of the choices, and to then play out his chosen hand to its conclusion. In this way, a player may tend to receive more favorable starting hands of video poker and to thereby have a more enjoyable gaming experience.

In various embodiments a first player at a first gaming device may place a wager on an outcome to be generated at a second gaming device. The first player may receive a payout based on his wager and the outcome generated at the second gaming device. For example, a novice video poker player may wish to place bets on the results of his friend, an expert player. Thus, the novice player may sit at a gaming device adjacent to his friend, and place wagers on the results obtained by his friend. The novice may then receive payouts based on his wagers and the results of his friend. In this way novice players or players afraid of strategic games may still gain enjoyment from participating.

In one or more embodiments, two or more team members may play independent hands of video poker. However, cards discarded by the team members may go into a common pool of discards. The pool of discards may then be used to create a hand of video poker that benefits the team. For example, suppose Sam is playing a game in which he holds the Js Jh 8c 5s 2d. Linda is playing a game in which she holds the Ad Ac 8s 4d 2c. Sam may discard the 8c 5s and 2d, while Linda may discard the 8s 4d and 2c. The common pool of discards may therefore consist of the 8c 5s 2d 8s 4d 2c. From this pool of discards, the best poker hand according to most conventional standards would be 8c 8s 2d 2c 5s, for an outcome of two pair. The team (in this example, Sam and Linda) may then receive a payout based on the outcome formed from all the team's discards. For example, Sam and Linda may each receive one coin based on the outcome. Team members may, in addition, receive payouts based on the hands formed from their own initial starting hands (e.g., from hands formed by replacing their discards). Note that outcomes formed from team discards need not correspond to the same pay schedule as outcomes formed from team members' starting hands. The present embodiments may create interesting and exciting strategic considerations for members of a team. For example, a member of team may face the dilemma of keeping a favorable card for himself, or of discarding the card so that the discarded cards of the team will form a favorable outcome. Adding to the dilemma may be the fact that a given team member will keep a payout based on his own hand all to himself, whereas he will have to split a payout based on the team's discards with his fellow team members.

In various embodiments, team hands formed from discards need not contain only five cards. For example, if on a team of four, two team members each discard three cards, and two team members each discard two cards, then there are now ten discards in the team's pool of discards. From these ten cards, "super-hands" may be formed. For example, hands consisting of ten cards in ascending rank order may form "super-straights". Note also that five card hands may be formed that would be impossible to form from conventional fifty-two card decks. For example, "five-of-a-kinds" could be formed, or "pair-flushes" could be formed. This is because cards in the pool of discards are taken from separate decks. A team may receive special payouts for hands using more or less than five cards, or for various hands unavailable through standard play with a fifty-two card deck.

In various embodiments, the pool of a team's discards is limited in size. The pool may, for example, be limited to containing only five cards. If a subset of team members have already discarded five cards during a particular game (e.g., where one game involves each player on a team playing an independent hand at his/her own gaming device), and another team member discards a sixth card, then the sixth card may displace one of the cards already discarded. This may be unfortunate, as the five cards already discarded may form a favorable team hand. Therefore, team members may face a dilemma in making discards. On the one hand, they may desire to rid themselves of unfavorable cards. However, on the other hand, they may wish to avoid displacing more favorable cards in the team hand. So team members do not collaborate on an order in which to make discard decisions (e.g., such that the five best cards for the team hand are the last to be discarded), there may be a fixed protocol with which discards from individual hands populate the team hand. For example, the protocol may dictate that team member one's discards are all to populate the team hand first, followed by team member two's discards, and so on. In some embodiments, if the team hand is already full, then no team member may make any further discards. Such team members may thereby be stuck with less than desirable hands.

In various embodiments, multiple team hands may be formed from a pool of discarded cards. Such hands may be formed based on a defined order. For example, the discards of team member one populate card one of hand one, card one of hand two, card one of hand three, card two of hand one, etc. Alternatively, the server may form one or more hands from the pool of discards according to the formation most favorable to the players. The server may also form the team hands based on a random ordering of the pool of discards. For example, the server may shuffle the pool of discards and deal them out into the prescribed number of team hands.

In various embodiments team members may have the opportunity to swap or trade cards. For example, if team member one needs the Jd to make a favorable hand, and team member two needs the 8c to make a favorable hand, then team member one may provide the 8c to team member two in exchange for the Jd. Of course, trades need not benefit both team members. Also trades may be made among several team members.

In some embodiments, a first team member may purchase a card from a second team member. For example, a first team member may purchase the 6d from a second team member by providing the second team member with five credits. The card and/or credits may be transferred via a casino network. In some embodiments, a trade may involve both credits and card(s) from a team member. For example, one team member may trade five credits and an Ah for a 6d. Once a first team member has received a card from a fellow team member, the first team member may utilize the card in his own hand of video poker.

In some embodiments, team members all choose discards, which then enter a pool of discards. Team members may then choose replacement cards from among the pool of discards. In this way, team members are essentially engaging in a team-wide trade of cards. If it so happens that more than one team member desires a particular card from the pool of discards, then the card may be assigned at random, by vote, according to a predetermined priority of the team members, or by some other assigning means. In some embodiments, replacement cards are dealt at random to members of a team from the pool of discards. In these embodiments, a first team member may discard cards that might help a second team member. However, the second team member is not guaranteed to receive such cards, as they may instead go to other team members (or back to the first team member). This may create some excitement in that a first team member needs one card to a highly favorable outcome, and a second team member has the needed card. The first team member and the second team member may then each discard and hope that the discard of the second team member finds its way to the first team member.

Video Poker Tournaments

In various embodiments one or more players may compete in a tournament involving play of a video poker game. Tournament entrants may each pay an entry fee. Each may then sit at a separate gaming device. These gaming devices may include certain gaming devices specially designated for tournament play. Gaming devices designated for tournament play may, for example, have paying functions disabled (e.g., such gaming devices may not respond to a "cashout" selection), and may have especially high payout tables. During the course of a tournament, entrants may play as many video poker hands as they can in an effort to accumulate the most in aggregate payouts. An aggregate payout may be tallied, e.g., as a credit balance. An entrant's aggregate payout may be visible to all other entrants, as on the screens of the other entrants' gaming devices. Alternatively, the aggregate payouts of the tournament leaders at any one time may be displayed for the other entrants. At the end of a tournament, entrants may receive cash or other prizes based on their aggregate payouts in relation to the aggregate payouts of the other entrants. For example, the entrant with the highest aggregate payout may receive $1000,the second finishing entrant may receive $500, and so on.

Tournament play of video poker may present some interesting strategic decisions for players. A player may wish to play quickly in view of the fact that more payouts can be obtained if more outcomes are generated in the first place. However, a player may not wish to play so quickly that he does not have time to make good decisions. Furthermore, players may make decisions based on their relative standing in the tournament at any one time. A player leading the tournament may wish to make decisions that present maximum expected return. However, a person who is behind in a tournament may make risky decisions. For example, a person who is behind in a tournament may tend to pursue more high paying outcomes. Although hitting such outcomes may be unlikely, the person may require such outcomes in order to have a chance of winning the tournament.

In some tournament embodiments, all players may receive the same starting hands. For example, the fifth starting hand received by a first player will be the same as the fifth starting hand received by a second player. In this way, the tournament may be perceived to be more equitable, as each player starts with the same “luck”. In some embodiments, all “decks” used for a given hand (e.g., the tenth) hand, may have the same order. In this way, play is made even more equitable. However, there then arises the possibility that a first player will complete a given hand prior to the second player, and then inform the second player of the ordering of the deck used for the given hand, allowing the second player to employ a more favorable strategy than the second player might otherwise have employed. Therefore, in some embodiments, although each player may receive the same starting hand for corresponding handle pulls, each player may play out the deck using an independently shuffled deck of cards.

In addition to the feelings of equitability provided by tournaments in which players have the same starting hands, such tournaments may also provide discussion points for the players. For example, after a tournament, one player might ask another, “What did you do on that hand where you had three tens, but also three cards to the royal?” Players may tout their skill or foresight at having made a bold decision that turned out well for a hand in which other players were more timid.

In some embodiments, tournaments may form on an ad-hoc basis at ordinary gaming devices (e.g., at gaming devices that have not been especially altered for tournament play). When a predetermined number of players agree to engage in tournament play, the tournament may start. Each player may be required to pay an entry fee which may then help to form a tournament prize pool. During tournament play, players may continue to make wagers and receive payouts, as normal. The player with the most in gross payouts (i.e., payouts without regard to wagers), may win the tournament. After a predetermined period of time has elapsed since the start of the tournament, the leading player or players may receive a prize. In some embodiments, the casino may sponsor or contribute to a tournament prize, as tournaments may encourage players to engage in greater amounts of play.

In some embodiments a slot server may automatically create a tournament when two or more players are playing in proximity to one another, such as at adjacent gaming devices. The players may be free to ignore the tournament conditions, and to continue playing as normal. However, players may be encouraged to compete by the possibility of winning a tournament prize. The players may thereby be encouraged to play more rapidly and to thereby provide more business for the casino.

A player may automatically be entered into a tournament based on a triggering event. Triggering events may include: (i) the player’s credit balance reaches, exceeds, or falls below a certain level; (ii) the player achieves a certain outcome; (iii) the player completes a certain amount of play (e.g., a certain number of handle pulls).

Players may enter tournaments that are already in progress. Players who enter late may receive some automatic points or acknowledged winnings, even though the players did not actually attain the winnings. Such winnings may be set equal to, e.g., the average winnings of all current tournament players, the winnings of the worst performing tournament player, the winnings of the tournament player in the seventy-fifth percentile, and so on. Alternatively, players may receive acknowledged winnings based on a predetermined schedule. For example the schedule may indicate that a player who starts five minutes late may start with fifty points, a player who starts ten minutes late receives one hundred points, and so on.

Tournaments in which players begin with similar starting hands are not limited to video poker. In various embodiments, slot machine tournaments may allow all players to begin with one or more common symbols for corresponding spins. For example, on the tenth spin, all players may begin with “bar-bar” on the first two reels. The players may then each spin the third reel. Tournaments may allow players to begin from common situations in any game. In some embodiments, tournaments include play in bonus rounds. Accordingly, players may each start from a common game situation in a bonus round. For example, players may each start at “level three” of a multi-level bonus round.

In one or more embodiments, a player may be engaged in standard play at a gaming device. From this standard play, a subset of handle pulls made by the player may also count towards a tournament result. For example, every fifth outcome generated by a player at a gaming device may count towards a tournament result. Alternatively, the slot server may choose a random player outcome from every non-overlapping ten-minute interval during a player session. For example, one of a player’s outcomes may be chosen from outcomes generated between 10:10 and 10:20. Another one of the player’s outcomes may be chosen from outcomes generated between 10:20 and 10:30, and so on. Once the player has accumulated sufficient tournament outcomes, the player may become eligible to win a tournament prize. Similarly, teams may compete against other teams in tournaments. For example, the best outcome generated by a team within a given thirty-second interval may count towards a tournament result of the team. The thirty-second intervals may be chosen randomly by the slot server. Teams may not be informed of the chosen time intervals until after they occur. In this way, members of a team cannot tailor their play by playing especially fast only when they know their best outcome in the next thirty seconds will count towards a tournament result. Teams may thus be encouraged to play quickly throughout a day or other period of time.

In various embodiments, players may be identified as belonging to the same team through outward displays of their gaming devices. For example, the background colors of all the display screens of fellow team members’ gaming devices may be the same (e.g., may all be purple). Thus, one team may be represented by the color purple, e.g., as the purple team. Another team may be the orange team. Other badges of team membership may include flashing lights at gaming devices of team members, distinctive sounds at gaming devices of team members, distinctive graphics, and so on. In some embodiments, a first team member’s gaming device may display an arrow pointing to the gaming device of another team member. In this way, a chain of one gaming device indicating another gaming device may illustrate the connection of all members of a team with one another.

In various embodiments two team members may each be dealt the same starting hand. Each team member may then play out the same starting hand using a common deck of cards. In other words, replacement cards drawn by a first team member will be unavailable to a second team member. Therefore, a first team member may choose a first strategy. The second team member may then choose a second strategy based on the replacement cards dealt to the first team member. For example, if the first member held a pair and received two replacement cards of the same rank as the two pair cards in the starting hand, thereby making "four-of-a-kind," the second team member would be more likely to pursue a different strategy than that pursued by the first team member. This is because the second team member would be unable to obtain either of the two beneficial cards already obtained by the first team member. Instead, the second team member might choose a strategy to pursue a flush. The present embodiments may encourage a sampling of both "safe" strategies and "risky" strategies for a given starting hand. For example, one team member may try a safe strategy. If the strategy is effective, the second team member may feel as if the initial investment (the wager) has been recovered, so that more speculative approaches may now be employed without risk of loss.

In various embodiments, two or more players may engage in a competition with one another in which each contributes an amount to a prize pool. The contributed amount may be considered a wager, entry fee, or other type of payment. The players may then generate one or more outcomes. Players with the best series of outcomes (e.g., with the highest gross winnings from among the several outcomes) may receive the entire prize pool. In some embodiments, the contribution from each player is his or her wager at his or her respective gaming device. The prize pool is then the sum of all payouts received by all the players. Thus, the player who obtains the best series of outcomes during a competition period may receive an amount equal to the sum of all payouts obtained by all the competing players during the competition period. Losing players may receive nothing and may, additionally, suffer the loss of wagers expended during the competition.

In one or more embodiments, all payouts and other winnings from a group of players may be pooled into a common account. The account may, at the conclusion of some predetermined time period, be divided among the players equally, or according to predefined rules. In these embodiments, players may share the risk of loss among fellow group members, while also benefiting from any wins obtained by fellow players.

In one or more embodiments, five team members may each separately play out their own independent games of video poker on, e.g., five separate gaming devices, a single gaming device with five different seats and screens, or some combination of single and multi-player gaming devices. The final hands of the team players may then be combined into a five-by-five grid. In one or more embodiments the first row of the grid is formed by a first of the team members' hands, the second row of the grid is formed by the second of the team members' hands, and so on. The five-by-five grid will then contain at least twelve possible poker hands. One poker hand may be formed from each of the five rows. One poker hand may be formed from each of the five columns. Further, one poker hand may be formed from each of the two diagonals. The team may receive a payout based on the poker hands formed by the grid. For example, each of the twelve poker hands may be compared to a team payout schedule (which may be different from a standard payout schedule). The payouts for each of the twelve hands may be summed, and the resulting sum may then be divided equally (or in some other fashion) among the five team members. It will be appreciated that individual team hands may form the columns of the team grid, rather than the rows. The cards from all the five team hands may also be shuffled together and dealt into the grid at random. It will be appreciated that there are many other ways in which the grid may be populated by cards from team members' hands, and that these other ways are contemplated by the present invention. It will be appreciated that the grid may be formed from starting hands of the individual team members, as well as from final hands. The grid may also be formed from cards discarded by the team members. The grid may even be formed by some cards present in an initial hand of a team member, and by some cards present in a final hand of a team member. The grid may contain one or more wild cards, such as a wild card in the center that may act as any other card (or as several cards at once, e.g., if the same wild card forms a part of several different hands). It will be appreciated that rather than being paid for twelve hands of the grid, the team members may be paid based on the best hand contained in the grid, the best three hands, etc.

The present embodiments may create interesting strategic dynamics for team members. Team members may try to decide which cards to hold and discard from their hands based not only on the value of the cards to their own hands, but based also on the potential value of those cards within the team's five-by-five grid. To aid team members in making their discard decisions, each team member's gaming device may display the hands of all five team members in one five-by-five grid on its display screen. A team member may then decide whether to hold or discard a particular card based on how the decision would effect hands of the team grid incorporating that card.

In various embodiments employing a five-by-five grid of cards as a team outcome, wild cards may be added. For example, a wild card may always automatically populate the center of the grid, much as a free space populates the center of a bingo card. A wild card could also be added at random (e.g., to replace an existing card in the randomly selected space). In various embodiments, one or more players on the team might pay to move cards from one spot on the grid to another. Evidently, team members might use the ability to move cards in order to create better hands across the rows, columns or diagonals of the grid.

It will be appreciated that poker hands may be formed from any five cards contained within a grid, not just from rows, columns or diagonals. The present invention further contemplates grids of other dimensions. For example, each of six team members might receive six cards. A team grid might then consist of a six by six grid of cards. A poker hand in any given row of six, for example, might then be the best five-card hand of the six cards. Alternatively, the poker hand might be evaluated according to a six-card standard in which, for example, flushes require six cards of the same suit rather than five. Grids might also be formed from six hands of five cards (for a six by five grid), from four hands of five cards (for a four by five grid), or from any other conceivable combination of team members' hands.

In various embodiments, there may be a predefined order as to how team members' hands populate a team grid. For example, a first predetermined team member's hand might always form the first line of the grid. A second predetermined team members' hand might always form the second line of the grid, and so on. In some embodiments, team members' hands may populate a grid in the order that the team members complete their hands. For example, the first team member to choose discards and receive replacement cards may have his hand go in the first row of the grid. The second team member to choose discards and receive replacement cards may have his hand go into the second row of the grid, and so on. Team members' hands may also populate the grid according to their rankings. For example, the highest ranking hand from among the team members' hands may go in the first row of the grid, and so on. In some embodiments, each team member is assigned a random number at the start of a game. The random numbers may range from one to five, and each number assigned may be different. The rows of the five-by-five team grid are also assigned random numbers in the same range. Then, the completed hand of each team member is assigned to the row whose number corresponds to the random to number assigned to the team member at the start of the game.

In some embodiments, a grid may be populated by only a single player. For example, a player may play five separate games of video poker. The games may be consecutive. The games may or may not be played using cards from the same deck. Cards from the five games (e.g., the cards of the final hand in each game) may be used to populate a five-by-five grid. Thus, after five games, a five-by-five grid may be fully populated. After the grid has been fully populated, the player may receive a bonus based on the poker hands formed in the five-by-five grid. Of course, a single player may populate a grid of other dimensions, and need not take as many or as little as five hands to do so.

Playing Table Poker Using Slot Machines

In some embodiments players may compete with one another as if in a real game of poker. That is, players may bet against one another, trying to bluff their opponents into folding, or trying to lure their opponents to bet when the players themselves hold good hands. Exemplary games of poker include five-card draw, seven-card stud, Texas Hold'em, and Omaha. Such games are conventionally played at tables with live dealers, real cards, and face to face with real opponents. However poker games played in conventional ways can prove intimidating to new or inexperienced players. When novices hesitate because they are unsure of the rules of play, other players may become impatient and pressure the novice, causing considerable embarrassment. Therefore novices and other players may prefer playing against other players in a networked environment using a device such as a slot machine or video poker machine as a network terminal.

Thus, in one or more embodiments, a gaming device may serve as a network terminal for a game of poker against other human opponents. A server may determine cards to be dealt to players, as well as community cards (i.e., cards that may be used by any player in a poker game to form a poker hand). A player's hand may be displayed on his gaming device, while community cards may be displayed on the gaming devices of all players involved in a game of poker. A player may insert money into his gaming device. Such money may then be used for making bets, calls, raises, etc., and for posting antes in a game of poker. Players may use various buttons on their gaming devices to indicate a type of bet. Such buttons may be labeled, e.g., "bet," "fold," "call," "raise," "check," and so on.

Conventional gaming devices do not make an effort to conceal what is displayed on their display screens. However, if a gaming device is used for the game of poker, then it may be desirable that only a player be able to see at least some of the contents of the display screen. For example, if a player's cards are displayed on the display screen, the player does not want others to see the cards, as other viewers may include opposing players at nearby gaming devices, or confederates of other players. Therefore, in one or more embodiments of the invention, a gaming device includes a display screen that is easy for a player to conceal. The display screen may lie approximately parallel to the ground, so that it is easy for a player to rest his hand over the top of the display screen. A player may thus maintain his hands over the images of cards dealt to him. When a player needs to see his cards, the player may part his hands slightly in such a way as to give him a view, but make it difficult for others to see the hand. Various embodiments of the present invention also envision a display which lies very close to, or which coincides with, the outside surface of the gaming device. This contrasts with a display screen that is inset into a gaming device, with a glass or plastic protective shield several inches above. A player would have more difficulty concealing the view of such an inset display screen, as another player would be able to look under the player's hands from the side.

In various embodiments, a poker player may desire to use his hands for other purposes than just concealing cards shown on his display screen. For example, the player may wish to lift his hands to press buttons in order to indicate a wager selection. Therefore, in various embodiments, a player may provide an indication that he wants his cards to be hidden. For example, a player may look at his cards after they are dealt and may then press a "hide cards" or similarly labeled button. The player's cards may then become hidden. For example, the backs of the cards may be displayed on the display screen. If the player later wishes to view the cards again, the player may press a "show cards," "unhide cards," or similarly labeled button.

In various embodiments, a player may conceal cards by means of a sliding door or other substantially opaque contraption that that slides over or covers the area of the screen where the player's cards are shown.

In various embodiments, one player involved in a poker game against other players may receive hints from the slot server in the guise of a friendly avatar displayed on the player's display screen. The avatar may give the player hints as to the cards held in an opponent's hand, the percentage of times in which an opponent has bluffed in similar situations to this, the percentage of times in which an opponent has folded when someone has made a prior bet, and so on. If an avatar gives a player information that would not ordinarily be available in a poker game (e.g., information about the cards held by the opponent), then the player's opponent may share in any winnings obtained by the player.

Hints given to a player may take the form of a "bluff meter." A bluff meter may graphically (e.g., through a dial) indicate the likelihood that an opponent is bluffing. The likelihood may be derived from historical statistics about the opponent's play, or through actual inside knowledge of the opponent's hand by the slot server. A bluff meter may, in some embodiments, indicate the likelihood that an opponent has a range of hands. For example, a bluff meter might indicate that the opponent probably has a "weak" hand, or probably has a hand with two-pair or better.

In various video poker embodiments (whether or not teams are involved), a deck may include one or more special cards that trigger a bonus round. Special cards may include standard cards (e.g., the jack of diamonds), or they may include new cards, such as a card labeled "Bonus Round!" When a special card is dealt, the player may enter into a bonus game, in which, as is well known, play may differ from regular play, and in which payouts may often be achieved more readily and at little risk to the player.

In various team embodiments, one player may transfer credits or other currency to another player, such as a fellow team member. The player may transfer money using visual representations of currency owned by the player. For example, the player may use a mouse pointer, track ball, or his own finger (e.g., on a touch screen) to drag and drop "coins" representing the player's credit balance to an area of his display screen labeled with a teammate's name and/or an icon representing the teammate. The number of credits corresponding to the coins dragged and dropped may then be deducted form the player's balance and added to the team member's balance. Before the transfer is completed, however, the player may receive a confirmation screen in which he is asked whether he really wants to give the indicated amount of credits to his teammate (or to the other player). If the player answers affirmatively, then the transfer may be completed. Transfers of currency allow one team member to support another who may have run out or money. Without the participation of one team member, the whole team may suffer. For example, a team may require at least five players to be viable. Therefore, the transfer of credits may better enable team play. Further, husband-and-wife couples may transfer credits to one another so that, e.g., one does not have to get up from his/her gaming device to go ask the other for more money, thereby allowing others to take the gaming device.

Community Cards

In various embodiments, two or more players may share community cards. As used in the present embodiments, "community cards" may be cards that may be used by each or any of two or more players in order to form a hand of poker. In one example, each player receives three personal cards, and there are five community cards. For instance, during a given game, the community cards may be: As 10d 4c 3c 2c. Joe may receive as his personal cards: Js 9c 5d. Sue may receive as her personal cards: 10s 10c 7h. Joe's best hand employs the best five cards from among his three personal cards and the five community cards. Therefore, Joe's hand currently ranks as a straight: 5d 4c 3c 2c As. Sue's best hand currently ranks as three of a kind: 10s 10c 10d Ad 7h. In various embodiments, the game is finished after each player receives his/her personal cards and the community cards. Players are simply paid based on the best poker hands formed from their personal cards and the community cards. However, in some embodiments, players may have the opportunity to draw new cards to replace one or more of their personal cards. Thus, for example, Joe may keep his 5d, but discard the Js and 9c, hoping for e.g., the 6c 5c, which would give him a straight flush: 6c 5c 4c 3c 2c. Susan may keep her 10s 10c, but discard her 7h, hoping for the 10c (giving her four-of-a-kind) or for another card to pair with the As, 4c, 3c, or 2c, any of which would give her a full house. Once players have discarded and received replacement cards, players may be paid based on the best poker hands formed from their personal hands and from the community cards. In various embodiments, players may also choose to discard and replace community cards. In such embodiments, each player may receive separate copies of the community cards. In other words, community cards may be displayed on the display screens of each of the players. The players may each then choose whether or not to keep or discard community cards. A replacement card dealt for a discarded community card may only count for the player who discarded the community card. In various embodiments, all players involved in a single game (e.g., a sequence of events in which community cards are dealt, personal hands are dealt to participating players, and final outcomes are determined for each of the participating players based on their personal hands and the community cards) may play from the same deck. In other words, replacement cards dealt to a first player involved in a game may be unavailable for dealing to a second player. Alternatively, each player may play from separate decks. The deck used for a given player may, however, have removed from it the community cards and the personal cards already dealt to that player. Additionally, the separate decks may be shuffled in different ways. In one exemplary game, community cards are dealt from a first randomly shuffled deck. Electronic decks used for each participating player then have the community cards removed. Then, each player receives his personal cards from his own deck (e.g., the electronic deck used by his gaming device). The player then chooses discards and receives replacement cards from his own deck.

Video poker embodiments involving community cards may have a strong psychological draw for players. If for example, community cards are favorable, then all participating players will form advantageous hands. For example, if community cards themselves form a full-house, then all participating players will achieve at least a full house. Therefore, if a player misses a game in which favorable community cards were dealt, he will see a whole group of others doing will and will feel as if he has missed out. Therefore, a player may be tempted to join in a game involving community cards due to the desire not to miss out. Additionally, if community cards are poor, then, by being involved, a player can share his disappointment with other players also involved. Therefore, embodiments involving community cards can create a shared experience and camaraderie among video poker players. Players need not necessarily be on the same team or be related in any way. However, they may still enjoy a shared experience.

In one or more video poker embodiments, a player may sell a card from his hand. The player may, for example, designate a card in his hand for sale. The player may indicate a sales price or, alternatively, allow bidding on the card in an auction format. The slot server may, in turn, display the card on the display screens of other video poker players. The slot server may indicate on each of the display screens the identity of the card (e.g., the Ac) and may indicate the price. The price may include the price asked by the selling player plus, in some embodiments, a fee imposed by the casino.

A video poker player who sees a card for sale and who sees that he can use it may agree to buy the card. The player may agree by, for instance, touching an area of his display screen where the card for sale is displayed. The player's gaming device may then flash a confirmation screen asking if the player wishes to purchase the card for the asked price. If the player answers in the affirmative, then the price of the card may be deducted from the player's credit balance, and the player may then have the opportunity to incorporate the card into a current hand of video poker in which he is engaged. Meanwhile, the player who had sold the card may have the card disappear from his hand and/or display screen, and may have the price he had asked for added to his credit balance. Any difference between the amount paid by the buyer and the amount received by the seller may constitute the casino's commission, and may therefore be kept by the casino.

In various embodiments, it is important for the casino to keep a commission. Otherwise, players might cheaply purchase cards that would result in highly favorable outcomes, thereby costing the casino money. A casino can therefore set a commission in such a way that the extra value obtained by a player in terms of payout is lost in the commission. In other words, if a player can improve his payout by twenty-two coins (e.g., by improving his hand from a three-of-a-kind to a four-of-a-kind by purchasing a fourth card of a given rank), then the casino may charge a commission of twenty-two coins on the purchase. The casino has then lost no value from the transaction.

In some embodiments, a player may purchase a card before he has selected any replacement cards for a given starting hand. In such embodiments, a casino may construct a commission based on a change in the expected value of the purchaser's hand. For example, if, by purchasing a given card, a player can increase the expected value of his hand from three coins to six coins, then the casino may charge a commission of three coins on the sale of the card.

In some embodiments, the sold card is one of the cards discarded by the seller during his own game of video poker. In other embodiments, a sold card may be any card held by the seller, even if the card is in the final hand of the seller. In such embodiments, if the card is sold, it may not count in the seller's hand.

In some embodiments, a deck may include a special card, designated as a "Sure Win" card. When dealt to a player on a given hand, the card may allow a player to play a subsequent hand of video poker in which he is sure to obtain a winning hand (e.g., a hand with a positive payout). In addition, in some embodiments, a first player may be able to transfer the "Sure Win" card to a second player. For example, suppose the first and second players are on a team, and the second player has suffered a losing streak. The first player may obtain a "Sure Win" card and transfer it to the second player in order to cheer him up and break his losing streak.

In some embodiments, a first player at a gaming device may recruit other players to begin play at other gaming devices. The first player may instruct the other players to designate the first player as the player that recruited them. For example, the first player may instruct the other players to type in an identifying number for the first player. The first player may receive better odds in a game as a function of the number of players he recruits. For example, if a player recruits one other player, then the player may play with a deck in which all two's are removed. The player is thereby more likely to obtain a pair, Jack's or Better. If a player recruits two other players, then the player may play with a deck in which two's and three's are removed, and so on. Of course, a player may also receive improved payouts based on the number of other players he recruits. Note that the present embodiments may just as well apply to the play of reel slot machines as to video poker. A player may receive improved odds of hitting a winning outcome for every player he recruits. Evidently, a casino benefits from increased business when players are recruiting others to play.

In one or more embodiments, one or more team members may place a wager for a team outcome that is guaranteed to be a winner. The team outcome may be formed from the discards of team members, or from any other cards held by the team members. Supposing, for example, that the team outcome is a five-card hand consisting of discards, the server may always form a five-card hand from the discards wherein the five-card hand has a positive payout. If no such hand can be made from the existing discards, then team members may be allowed to contribute cards held in their hands (such cards may still count towards individual payouts for the team members). If a paying team outcome still cannot be formed, then team members may be allowed to repeatedly draw one or more cards from the deck to replace one or more cards in the team outcome in order to guarantee that the team outcome will be a winner. In embodiments where a team outcome is guaranteed to win, the wager that must be provided by the team may be higher.

In various embodiments in which team members are allowed to trade cards, trades may be suggested or carried out automatically by the slot server. The slot server may take the guise of an avatar. The avatar may, for example, be shown carrying away one card from a first team member's hand, walking off the screen of the first team member's gaming device, walking onto the screen of a second team member's gaming device and depositing the card. The avatar may then retrieve a card from the second team member for use by the first team member. The slot server may select trades of cards in such a way as to maximize the sum of the payouts for all of the hands of the team members. Team members may, in some embodiments, decline or overrule the suggestions of the slot server.

In various embodiments involving team play, a team member may desire to leave his gaming device. For example, the team member may need to use the restroom facilities. However, the team member may disrupt team play by leaving, even temporarily. Thus, in one or more embodiments, a departing team member may set his gaming device into "auto-play" mode. The gaming device may then make strategic decisions autonomously. The gaming device may make decisions according to a predetermined strategy table, such as a table detailing optimal strategy in any given situation. Alternatively, the departing player may leave instructions as to how to play various hands. In various embodiments, the departing team player's hands of video poker (or other game situations) may be displayed on the display screens of one or more of his fellow team members. The other team players may then serve as a check on the decisions of the gaming device. For example, other team players may have the ability to overrule the decisions of the departed player's gaming device if they feel the gaming device's decisions are incorrect. Fellow team players may then provide their own decisions, transfer such decisions through the network to the departed player's gaming device, and thereby cause the departed player's gaming device to play in accordance with their decisions. In some embodiments, fellow team members, such as a team captain, may play for the departed player directly, without the departed player's gaming device suggesting any decisions.

In one or more embodiments, a first video poker player may purchase the starting hand of a second video poker player. For example, Joe and Sue are video poker players. Sue obtains a starting hand of: 4s 5s 6s 8s Kh. Joe, sitting next to Sue, sees Sue's hand and wishes he could play it out. Therefore, he indicates at his gaming device a desire to purchase the current starting hand at Sue's gaming device (in some embodiments, Joe may enter indications of the cards of Sue's hand into his gaming device). Joe's gaming device may then quote him a price for purchasing the starting hand. Joe may then insert currency, or have credits deducted, in an amount sufficient to cover the cost of the hand. The starting hand of: 4s 5s 6s 8s Kh may then appear on the screen of Joe's gaming device. Joe may then play out the hand as he sees fit, and receive a payout based on the final hand. For instance, Joe may discard the Kh, receive a replacement card of 10s, and receive a payout of six coins for a flush. Note that the price of purchasing the starting hand may be determined based on the expected value of the purchased hand. For example, if a player can expect to earn an average payout of five coins from a given starting hand, the player may be required to pay at least five coins in order to begin from the designated starting hand.

In various embodiments, a method performed by a casino server, gaming device, network of gaming devices, or other system or entity, may include the following steps. A first card may be determined for a first player at a first gaming device.

In some embodiments, only a first card is determined for the first player at the first gaming device. A second card may be determined for a second player at a second gaming device, in which the first card and the second card form part of a starting hand of a single game of poker.

The starting hand of video poker may further include a fifth, a sixth, and a seventh card determined for a third, a fourth, and a fifth player, respectively. A first discard decision from the first player may be received. For example, the first player may decide whether to hold or whether to discard the first card. The first player may make his decision after one or more cards of the starting hand (e.g., after all of the cards of the starting hand) have been determined. A second discard decision from the second player may be received. A third, a fourth, and a fifth discard decision may be received from the third, the fourth, and the fifth player, respectively. A third card for the first player may be determined based on the first discard decision. For example, if the first player decided to discard the first card, then the third card may be a new card that is dealt from an electronic deck stored in the memory of the first gaming device. If the first player decided not to discard the first card, then the third card may be the first card.

A fourth card for the second player may be determined based on the second discard decision. An eighth, a ninth, and a tenth card may be determined based on the third, the fourth, and the fifth discard decision, respectively, from the third fourth, and fifth players. A final hand of the game of poker may be determined based on the third card and the fourth card. For example, the final hand may be a hand that includes the third and fourth cards. The final hand may also be determined based on the eighth, ninth and tenth cards. For example, the final hand may include the third, fourth, eight, ninth and tenth cards. In some embodiments, the final may consist only of the third, fourth, eighth, ninth, and tenth cards. A payout may be provided to a group comprising the first and second players based on the final hand. The same group may also comprise the third, fourth, and fifth players, which group may also receive the payout.

In various embodiments, a separate hand of video poker is determined for each member of a team, in which the team comprises at least two players. An indication of a preferred hand from among the determined hands is received from at least one of the members. For example, the team captain may choose a hand from among the determined hands. In some embodiments, a vote as to the preferred hand is received from each team member. Each of the determined hands is then replaced with the preferred hand.

Once each of the determined hands has been replaced, a separate indication of a set of discards is received from each team member. Then, for each member, cards from the preferred hand are replaced with new cards based on the member's indication of a set of discards, thereby forming a final hand for each member. For example, replacement cards are dealt to each team member, with each team member receiving replacement cards from a separate deck. Then, a payout is provided to each team member based on the member's final hand.

In various embodiments, an indication is received of a first card discarded from a first hand of video poker belonging to a first player. An indication is received of a second card discarded from a second hand of video poker belonging to a second player. The first and second players may be members of the same team. Then, a third hand of video poker is determined, the third hand comprising the first and second cards. The third hand may further comprise additional cards that have been discarded by the first, second, and/or other players of the team. Then, a payout for the team is determined based on the third hand of video poker.

In various embodiments, a player may be able to include a card discarded by a team member into his own hand. Thus, in various embodiments, an indication is received of a first card discarded from a first hand of video poker belonging to a first player. An indication is received of a second card discarded from a second hand of video poker belonging to a second player. A pool of discards is determined comprising the first card and the second card. The pool may, in various embodiments, include additional cards as well, such as cards discarded by a third player. Then, an indication is received from the first player of a third card included in the pool of discards. In some embodiments, the third card may be the second card. Thus, the first player is able to pick up for his own hand the same card that was discarded by the second player. The third card is then included in a second hand of video poker for the first player. A payout may then be provided to the first player based on the second hand of video poker.

In various embodiments, players may engage in video poker tournaments in which each player gets similar starting hands. Thus, in various embodiments, a starting hand of video poker is determined. A first player is then provided with the starting hand of video poker. A second player is then provided with the starting hand of video poker. Thus, for example, the first and the second players have received the same starting hands. After the first player has received the starting hand, an indication of a first set of discards is received from the first player. Likewise, an indication of a second set of discards is received from the second player. A first final hand of video poker is then determined based on the starting hand and first set of discards. The final hand may be determined, for example, for the benefit of the first player. Similarly, a second final hand of video poker is determined based on the starting hand and second set of discards. The second final hand may be determined for the benefit of the second player. The first and second final hands may be determined from separate decks of cards, each of which has been shuffled independently. Thus, the first final hand may be different from the second final hand.

Based on the first final hand, a first score may be determined for the first player. Based on the second final hand, a second score may be determined for the second player. A payment may be provided to the first player based on the first score and the second score. For example, if the first score is larger than the second score, than the first score may allow the first player to finish ahead of the second player in a tournament. Thus, a tournament prize may be determined for the first player based on the first score and the second score.

In various embodiments, members of a team may contribute cards to a common grid. The grid may serve as the basis for arranging contributed cards in various arrangements, such as in a five-by-five arrangement. Further, hands of poker may be formed based on the cards in the grid. Thus, in various embodiments, a first card is received from a first player. The first card may be a card that has been discarded from a hand of poker belonging to the first player. The first card may also be a card from a hand of poker belonging to the first player, in which the first card has replaced a card previously discarded by the first player. A second card is received from a second player, in which the first player and the second player are members of a same team. A grid of cards is then determined, the grid comprising the first and second cards. The grid may comprise at least two rows of cards and at least two columns of cards. In some embodiments, the grid consists of five rows and five columns of cards. A first hand of poker is then determined based on the grid of cards. The first hand of poker may be determined based only on cards included in a single row of the at least two rows of the grid. The first hand of poker may, alternatively, be determined based only on cards included in a single column of the at least two columns of the grid. In some embodiments, the first hand of poker may be determined such that the first hand of poker comprises the first card and the second card. A payment is then determined for the team based on the first hand of poker. In some embodiments, a second hand of poker is determined based on the grid of cards, and the payment is then determined based on the first and second hands of poker.

In some embodiments, first cards may be received from the first player. The first cards may then be used to populate the grid such that a row of the at least two rows of the grid consist only of the first cards. Alternatively, the first cards may then be used to populate the grid such that a column of the at least two columns of the grid consist only of the first cards.

In some embodiments, the determination of the grid includes a determination of a grid comprising at least one diagonal of cards. Then, the determination of the first hand of poker may include a determination of the first hand of poker based only on cards included in a single diagonal of the grid.

In various embodiments, several players may participate in a game of video poker in which each player has personal cards, and there are common community cards. Each player's final hand may be formed using the player's personal cards and the community cards. Thus, in various embodiments, a first wager is received from a first player. A second wager is received from a second player. A set of community cards is determined. For example, the set of community cards may be dealt from an electronic deck. A first set of personal cards is determined for the first player. A second set of personal cards is determined for the second player. A first hand of poker is then determined based on the first set of personal cards and the set of community cards. For example, the first hand may include cards from the first set of personal cards and cards from the set of community cards. The determination of the first hand may further include the determination of the best five-card hand of poker from among the set of cards that includes the community cards and the first set of personal cards. A second hand of poker is then determined based on the second set of personal cards and the set of community cards. A payout is then determined for the first player based on the first wager and the first hand. A payout is then determined for the second player based on the second wager and the second hand.

In some embodiments, replicas of the community cards may be displayed on a gaming device in use by the first player. The first player may thus be able to easily ascertain how the first hand is formed. Replicas of the community cards may also be displayed on a gaming device in use by the second player. In some embodiments, replicas of the community cards are displayed on a display screen that is not associated with only a single gaming device. Thus, there may be a common display screen that is visible for both the first and second players, even though the first and second players may be at separate gaming devices.

In some embodiments, the first player may have the opportunity to discard one or more cards from a third hand (e.g., a third hand occurring before the first hand), before arriving at the first hand. Thus, in some embodiments, a third set of personal cards may be determined for the first player. An indication may be received of a set of cards to be discarded from the third set of personal cards. The first set of personal cards may then be determined for the first player based on the third set of personal cards and the set of discards.

Thus described, numerous other modifications, improvements and variations falling within the scope of the invention will occur to those skilled in the art.

What is claimed is:

1. A method comprising:

determining, by a processor performing a program for facilitating a poker game, a first plurality of cards for a first player at a first gaming device, the first plurality of cards being a starting hand of the first player for a first round of the poker game, thereby determining a first starting hand;

determining, by the processor, a second plurality of cards for a second player at a second gaming device, the second plurality of cards being a starting hand of the second player for a second round of the poker game, thereby determining a second starting hand;

receiving a first discard decision from the first player;

receiving a second discard decision from the second player;

determining a third card for the first player based on the first discard decision, the third card being one of the first plurality of cards and a card the first player has decided to discard from the first starting hand;

determining a fourth card for the second player based on the second discard decision, the fourth card being one of the second plurality of cards and a card the second player has decided to discard from the second starting hand;

adding the third card and the fourth card to a pool of cards common to a group comprising the first player and the second player;

determining that the third card and the fourth card, when added to additional cards available in the pool of cards as a result of previous discard decisions of the group, correspond to a winning bonus hand of the poker game; and providing, based on the winning bonus hand, a reward to the group comprising the first player and the second player.

2. The method of claim 1, wherein the first round of the poker game and the second round of the poker game comprise the same round, such that the first starting hand and the second starting hand comprise respective starting hands in the same round of the poker game.

3. The method of claim 1, wherein the reward for the winning bonus hand is determined from a payout schedule that is distinct from another reward schedule used for determining rewards to each of the first player and the second player for any final hands built by the respective players based on replacement cards dealt to the players after their respective discard decisions.

4. The method of claim 1, wherein the winning bonus hand comprised more than five cards from the pool.

5. The method of claim 1, further comprising:

determining, prior to adding the third card and the fourth card to the pool, that addition of at least one of the third card and the fourth card would cause a number of cards in the pool to exceed a predetermined maximum number; and wherein adding comprises displacing, with at least one of the third card and the fourth card, at least one card already in the pool.

6. The method of claim 1, further comprising:

determining that the third and fourth card, when added to additional cards already in the pool, may be used to form a plurality of different winning bonus hands; and selecting one of the plurality of different winning bonus hands based on a predetermined rule.

7. The method of claim 1, further comprising:

receiving, from the first player, a selection of one of the fourth card or another card in the pool that is not the third card, to add to cards remaining in the first starting hand as a replacement card; and determining, for the first player, a final hand based on the selection.

8. A computer-readable medium storing instructions, which instructions when performed by a processor cause the processor to:

determine a first plurality of cards for a first player at a first gaming device, the first plurality of cards being a starting hand of the first player for a first round of the poker game, thereby determining a first starting hand;

determine a second plurality of cards for a second player at a second gaming device, the second plurality of cards being a starting hand of the second player for a second round of the poker game, thereby determining a second starting hand;

receive a first discard decision from the first player;

receive a second discard decision from the second player;

determine a third card for the first player based on the first discard decision, the third card being one of the first plurality of cards and a card the first player has decided to discard from the first starting hand;

determine a fourth card for the second player based on the second discard decision, the fourth card being one of the second plurality of cards and a card the second player has decided to discard from the second starting hand;

add the third card and the fourth card to a pool of cards common to a group comprising the first player and the second player;

determine that the third card and the fourth card, when added to additional cards available in the pool of cards as a result of previous discard decisions of the group, correspond to a winning bonus hand of the poker game; and provide, based on the winning bonus hand, a reward to the group comprising the first player and the second player.

* * * * *